(12) United States Patent
McGeachie et al.

(10) Patent No.: US 7,606,796 B2
(45) Date of Patent: Oct. 20, 2009

(54) METHOD OF AND SYSTEM FOR DETERMINING CONNECTIONS BETWEEN PARTIES USING PRIVATE LINKS

(75) Inventors: John S. McGeachie, North Reading, MA (US); Agnes M. Macksoud, Lincoln, MA (US); Janet L. Duchaine, Harwinton, CT (US)

(73) Assignee: Generate, Inc., Maynard, MA (US)

( * ) Notice: Subject to any disclaimer, the term of this patent is extended or adjusted under 35 U.S.C. 154(b) by 561 days.

(21) Appl. No.: 11/279,511

(22) Filed: Apr. 12, 2006

(65) Prior Publication Data

US 2006/0287987 A1 Dec. 21, 2006

Related U.S. Application Data

(63) Continuation of application No. 10/562,087, filed as application No. PCT/US04/020805 on Jun. 28, 2004, and a continuation-in-part of application No. 10/747,550, filed on Dec. 29, 2003, now Pat. No. 7,047,244, which is a continuation of application No. 09/882,170, filed on Jun. 15, 2001, now Pat. No. 6,697,807.

(60) Provisional application No. 60/211,725, filed on Jun. 15, 2000.

(51) Int. Cl.
*G06F 17/20* (2006.01)
(52) U.S. Cl. .............. 707/5; 707/102; 707/10; 707/6; 707/4
(58) Field of Classification Search ........... 707/10, 707/3, 102, 100, 6, 5, 4, 2
See application file for complete search history.

(56) References Cited

U.S. PATENT DOCUMENTS

| | | | |
|---|---|---|---|
| 5,383,112 A * | 1/1995 | Clark | 705/8 |
| 5,915,252 A | 6/1999 | Misheski et al. | |
| 6,014,670 A | 1/2000 | Zamanian et al. | |
| 6,058,394 A | 5/2000 | Bakow et al. | |
| 6,134,559 A | 10/2000 | Brumme et al. | |
| 6,321,202 B1 * | 11/2001 | Raveis, Jr. | 705/1 |
| 6,442,544 B1 * | 8/2002 | Kohli | 707/5 |
| 6,622,083 B1 * | 9/2003 | Knockeart et al. | 701/202 |
| 6,697,807 B2 * | 2/2004 | McGeachie | 707/10 |
| 6,941,271 B1 * | 9/2005 | Soong | 705/3 |
| 6,947,897 B2 * | 9/2005 | Lortscher et al. | 705/14 |

(Continued)

FOREIGN PATENT DOCUMENTS

WO 9964970 A 12/1999

(Continued)

OTHER PUBLICATIONS

Oracle Sales and Marketing Connected Client Users Guide, Release 11, Mar. 1998.

(Continued)

*Primary Examiner*—Jean M Corrielus
(74) *Attorney, Agent, or Firm*—Holland & Knight LLP; Brian J. Colandreo, Esq

(57) ABSTRACT

A system and method for determining a connection between a one or more "from" connections points and one or more "to" connections points, wherein connections between the connection points are determined as a function of intermediate connections in the path formed between the "from" and "to" connection endpoints.

21 Claims, 20 Drawing Sheets

U.S. PATENT DOCUMENTS

| | | | |
|---|---|---|---|
| 7,047,244 B2 * | 5/2006 | McGeachie | 707/10 |
| 7,051,049 B2 * | 5/2006 | Samn | 707/200 |
| 7,107,241 B1 * | 9/2006 | Pinto | 705/38 |
| 7,137,100 B2 * | 11/2006 | Iborra et al. | 717/106 |
| 7,403,942 B1 * | 7/2008 | Bayliss | 707/5 |
| 2003/0158960 A1 | 8/2003 | Engberg | |

FOREIGN PATENT DOCUMENTS

| | | |
|---|---|---|
| WO | PCT/US01/19329 | 12/2001 |

OTHER PUBLICATIONS

Chaudhuri, S., et al., "An Overview of Data Warehousing and OLAP Technology," Sigmod Record, ACM, pp. 65-74, XP002115173, vol. 26, No. 1, Mar. 1997, New York, NY.

Supplementary European Search Report, dated Sep. 7, 2007, received in European Application No. EP 0196438.7, 2 pgs.

European Patent Office Examination Report, dated May 2, 2008, received in European Application No. EP 0196438.7, 7 pgs.

* cited by examiner

Entity Name: Company A

Ticker Symbol: COMA

Address: 145 Executive Drive
Boston, MA 02109

Company Executives: J.K., CEO
J.F., CTO
F.S., DIR

Connect PrivateLink to person

< Back

Connect PrivateLink to Michael S Dell
Results for Degrees 0, 1, 2

Results for Degree: 0

| List Name | List Owner | # Results | View |
|---|---|---|---|
| JSM's List | John McGeachie [John] | 0 | |
| JLD's List | Janet Duchaine [Janet] | 0 | |
| MMacksoud's List | Mimi Macksoud [Mimi] | 0 | |

1400

Results for Degree: 1

| List Name | List Owner | # Results | View |
|---|---|---|---|
| JSM's List | John McGeachie [John] | 0 | |
| JLD's List | Janet Duchaine [Janet] | 1 | ☑ |
| MMacksoud's List | Mimi Macksoud [Mimi] | 1 | ☑ |

1410

Results for Degree: 2

| List Name | List Owner | # Results | View |
|---|---|---|---|
| JSM's List | John McGeachie [John] | 4 | ☐ |
| JLD's List | Janet Duchaine [Janet] | 22 | ☐ |
| MMacksoud's List | Mimi Macksoud [Mimi] | 10 | ☐ |

1420

[View Table] [View Graphic] — 1430

Copyright © 2001 Orion's Belt Inc. All Rights Reserved. Privacy Statement.

METHOD OF AND SYSTEM FOR DETERMINING CONNECTIONS BETWEEN PARTIES USING PRIVATE LINKS

RELATED APPLICATIONS

This application is a Continuation of U.S. application Ser. No. 10/562,087 filed Dec. 23, 2005, which was the National Stage of International Application No. PCT/US04/020805, filed on Jun. 28, 2004, and is a Continuation-In-Part application of application Ser. No. 10/747,550 filed on Dec. 29, 2003 which is a Continuation of application Ser. No. 09/882,170 filed on Jun. 15, 2001 and issued as U.S. Pat. No. 6,697,807 on Feb. 24, 2004, which claims the benefit of priority to Provisional application Ser. No. 60/211,725 filed on Jun. 15, 2000, all of which are incorporated herein by reference in their entirety.

FIELD OF THE INVENTION

The present invention relates generally to a method of and system for determining connections between parties and, more particularly, to a connection searching method and system in which a user is capable of entering a source party and a target party and searching a host database to obtain lists of people or entities through which the source and target parties are connected. The system also is capable of determining a number of connections that are associated with one party.

BACKGROUND OF THE INVENTION

It is well known that personal contacts are advantageous when conducting transactions between parties. However, determining the contacts of one party of a transaction the contacts of the other party of the transaction and what contacts those contacts have in common can be very difficult and time consuming. Currently, there is no efficient method or system for determining such contacts between parties of a transaction.

SUMMARY OF THE INVENTION

In accordance with various aspects of the disclosure, provided is a method of determining at least one pathway between a source and a target, such method implemented in a computer system having at least one database comprising data defining individuals, entities, or both. The method may comprise defining a source list comprising one or more individuals, entities or both; defining a target list comprising one or more individuals, entities or both; and generating a set of intermediate connection points as a series of individuals, entities or both that collectively define the pathway from the source to the target, as a function of predetermined relationships among the individuals and entities comprising the pathway.

In accordance with other aspects of the disclosure, provided is a method of determining at least one pathway of one or more connections between at least one starting point and at least one endpoint, wherein one or more parts of the method are carried out by at least one computer system including or having access to at least one database. The method may comprise providing at least one host database comprising identification data for each of a plurality of individuals and entities, wherein for each individual or entity said identification data includes relationships to at least one other individual or entity; defining a starting point as a list of at least one individual or entity; defining an endpoint as a list of at least one individual or entity; and generating at least one pathway that identifies a set of intermediate individuals, entities or both. The identity of each intermediate individual or entity includes a first set of identification data in common with a set of identification data of an individual or entity from the starting point or of a prior intermediate individual or entity; and a second set of identification data in common with a set of identification data of a subsequent intermediate individual or entity or of an individual or entity from the endpoint.

In accordance with other aspects of the disclosure, provided is a system for determining at least one pathway of one or more connections between at least one starting point and at least one endpoint, wherein the system comprises at least one computer system including or having access to at least one database. The system further comprises a module for providing at least one host database comprising identification data for each of a plurality of individuals and entities, wherein for each individual or entity said identification data includes relationships to one or more other individual or entity; a module for defining a starting point as a list of at least one individual or entity; a module for defining an endpoint as a list of at least one individual or entity; a module for generating at least one pathway that identifies a set of intermediate individuals, entities or both. The identity of each intermediate individual or entity may include a first set of identification data in common with a set of identification data of an individual or entity from the starting point or of a prior intermediate individual or entity and a second set of identification data in common with a set of identification data of a subsequent intermediate individual or entity or of an individual or entity from the endpoint.

BRIEF DESCRIPTION OF THE DRAWINGS

The foregoing and other objects of this invention, the various features thereof, as well as the invention itself may be more fully understood from the following description when read together with the accompanying drawings in which:

FIG. 7 is a schematic diagram showing identification information included in a record of an entity, according to the present invention; and FIG. 8A-FIG. 21 are various figures showing the ClientLink and PrivateLink functionality that can be added to the system of FIGS. 1-7.

DETAILED DESCRIPTION

Figure 1:
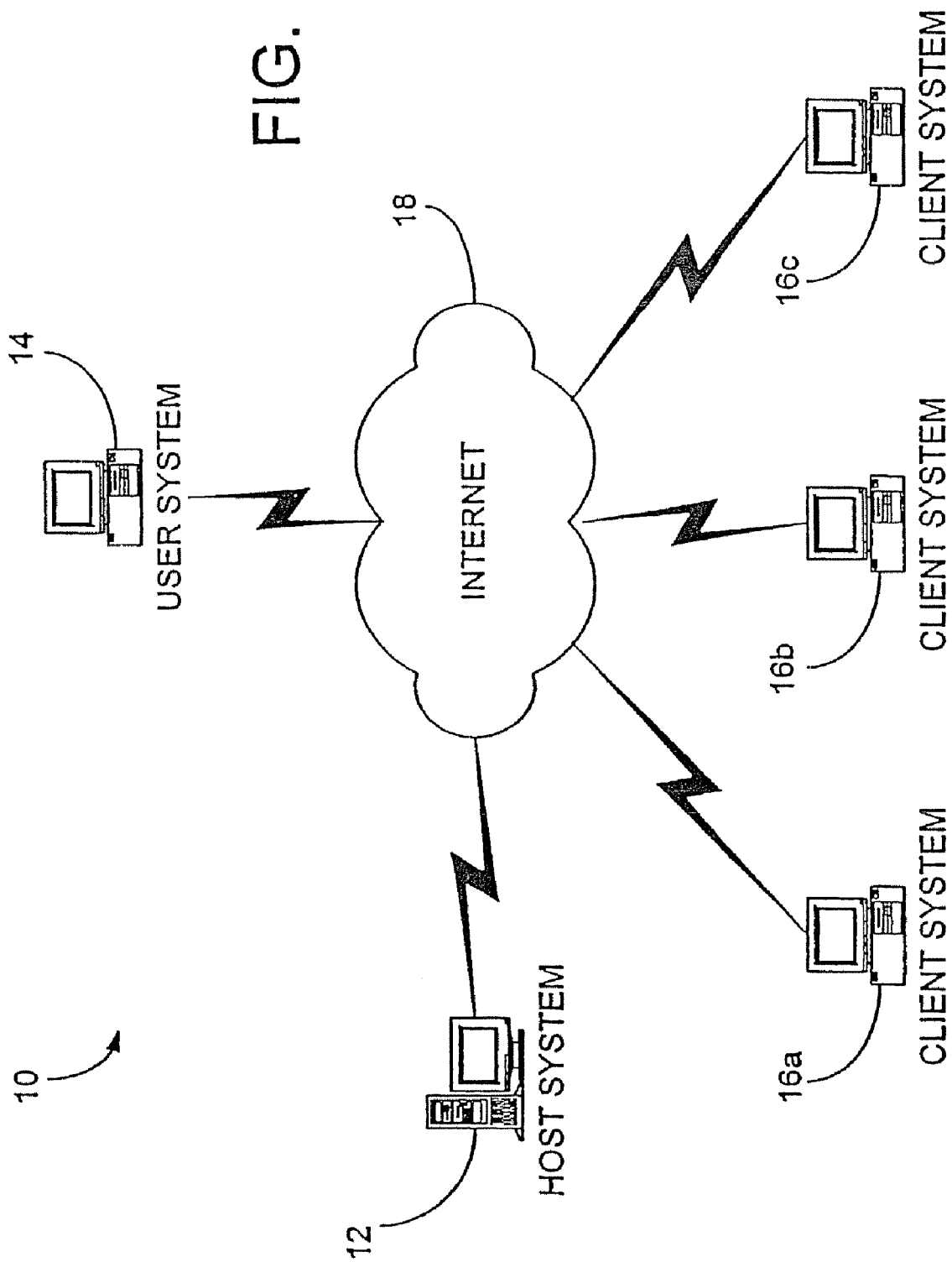
FIG. 1 is a schematic diagram of a system for determining connections between parties in accordance with the present invention.

FIG. 1 shows a schematic diagram of a system 10 for determining connections between parties in accordance with a preferred embodiment of the present invention. The system 10 includes host system 12, user system 14 and client systems 16a-16c, all connected to a common communications network 18. While three client systems 16a-16c are shown in FIG. 1, it will be understood that as few as one client system may participate in the study, or many more than three may participate. Three client systems are shown in FIG. 1 for the purpose of example only. Preferably, the host system 12, user system 14 and client systems 16a-16c are each a personal computer such as an IBM PC or IBM PC compatible system or an APPLE® MacINTOSH® system or a more advanced database computer system such as an Alpha-based computer system available from Compaq Computer Corporation or SPARC® Station computer system available from SUN Microsystems Corporation, although a main frame computer system can also be used. Preferably, the communications network 18 is a TCP/IP-based network such as the Internet or an intranet, although almost any well known LAN, WAN or VPN technology can be used.

In one preferred embodiment of the invention, the user system 14 is an IBM PC compatible system operating an operating system such as the Microsoft Windows® operating system, and host system 12 is configured as a web server providing access to information such as web pages in HTML format via a protocol such as the HyperText Transport Protocol (http). The user system 14 and client systems 16a-16c include software to allow viewing of web pages, commonly referred to as a web browser, thus being capable of accessing web pages located on host system 12. Alternatively, user system 14 and client system 16a-16c can be any wired or wireless device that can be connected to a communications network, such as an interactive television system, including WEBTV, a personal digital assistant (PDA) or a cellular telephone.

Figure 4:
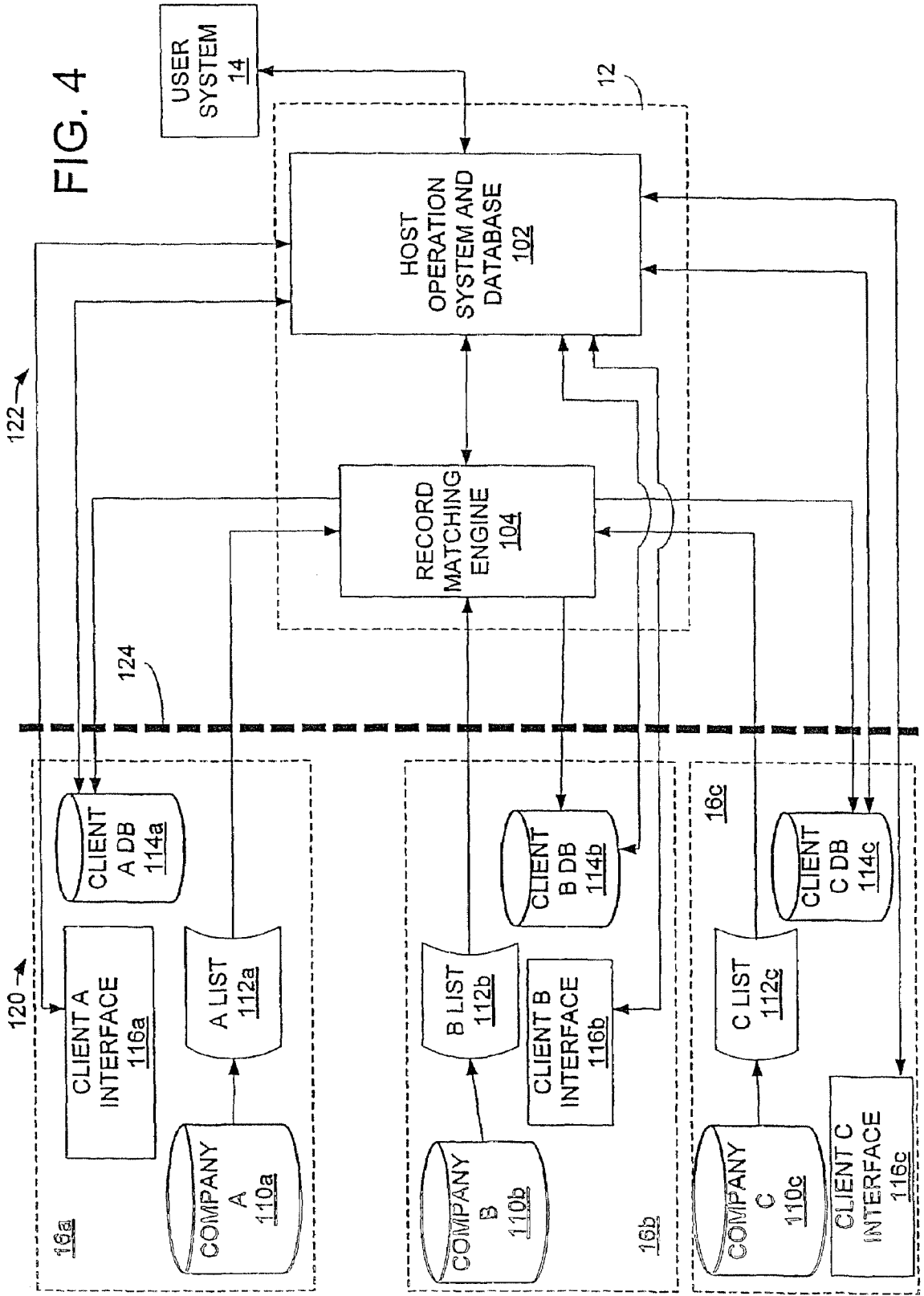
FIG. 4 is a detailed schematic diagram of the system for determining connections between parties shown in FIG. 1.

The method of and system for determining connections between parties will now be described with reference to FIGS. 2-7. FIG. 4 is a schematic block diagram showing a more detailed diagram of the system 10 of FIG. 1. As shown in FIG. 4, host system 12 includes a host operation system and database 102 and a record matching engine 104. As shown in the figure, the client systems 16a-16c are separate entities, each having a firewall, represented by dashed line 124. The client systems 16a-16c are located on the client side 120 of the firewall 124 and the host system 12 is located on the host side 122 of the firewall 124. Each of client systems 16a-16c include a company database 110 in which contacts of employees and officers of the company are stored. Typical contact programs which are used for storing contacts include ACT®, Outlook®, Goldmine®, and Lotus Notes®. Each client system also includes an intermediate list 112, a client database 114 and a client interface 116. The operation of these components is described in detail below.

Figure 2:
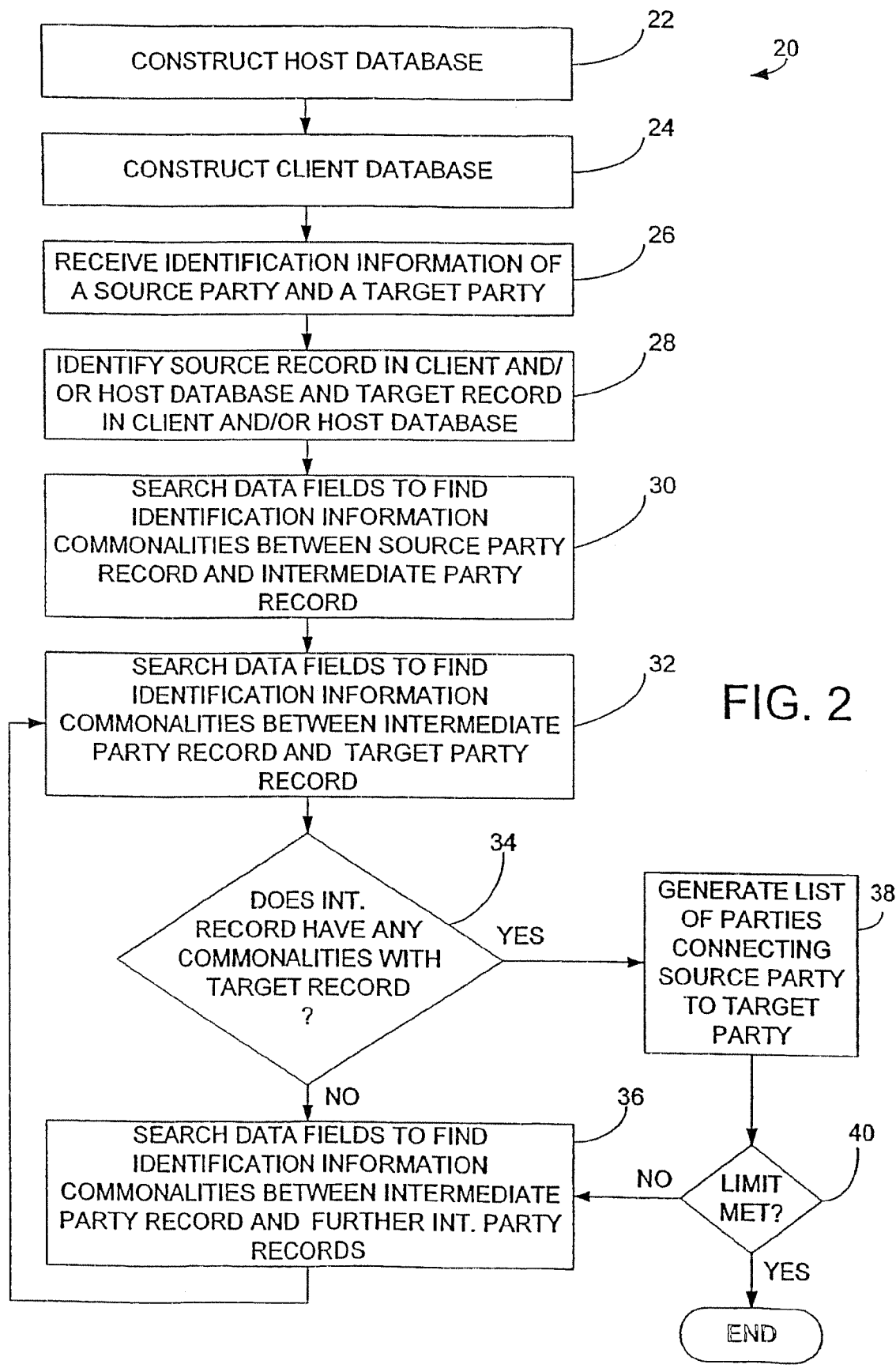
FIG. 2 is a flow diagram showing one embodiment of a method for determining connections between parties in accordance with the present invention.
Figure 3:
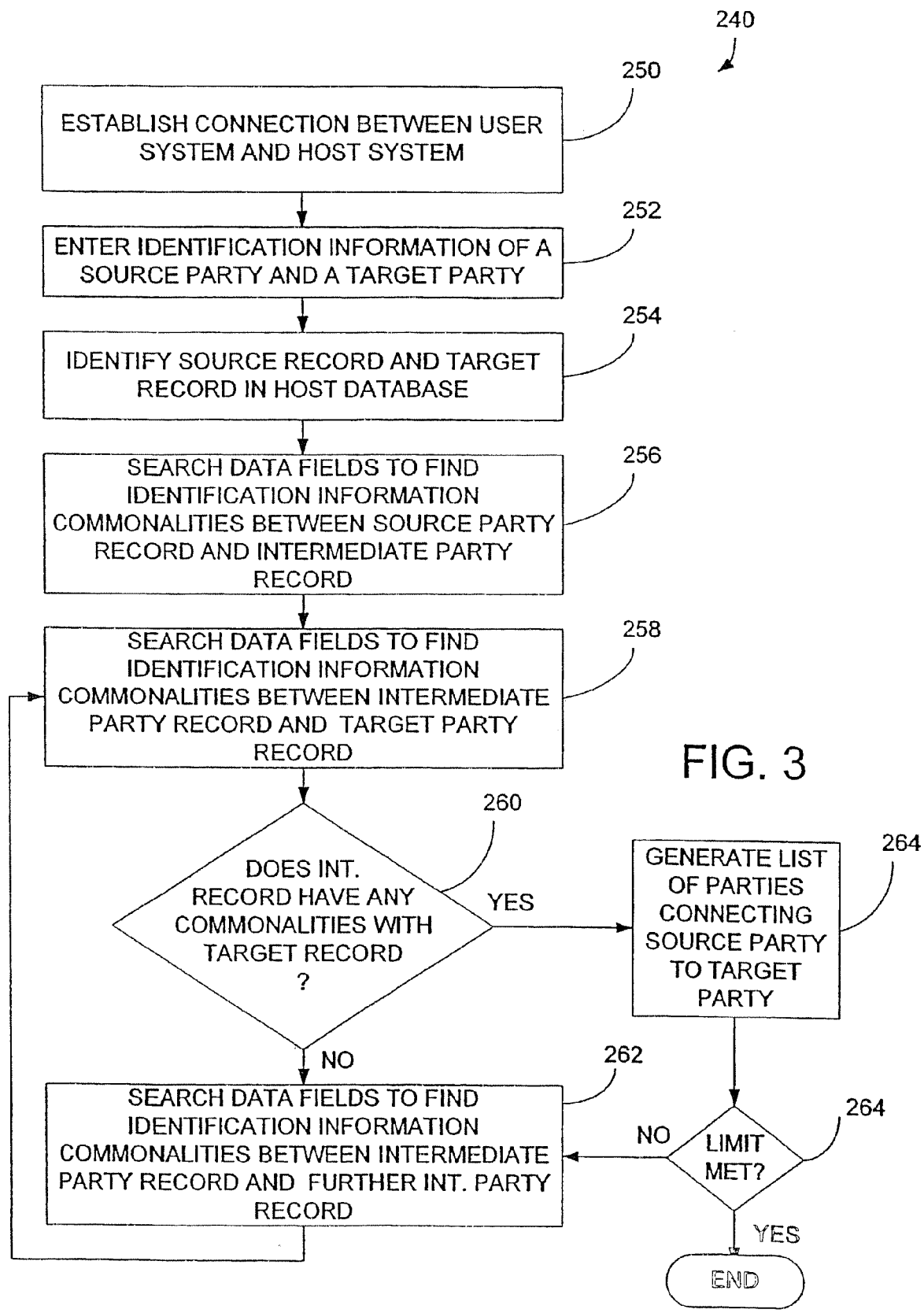
FIG. 3 is a flow diagram showing another embodiment of a method for determining connections between parties in accordance with the present invention.

FIG. 2 is a flow diagram 20 which shows the method of determining connection between parties. In step 22, the host database is constructed. This involves populating the database with information about people and entities such as companies, organizations, etc. This information is extracted from non-restricted sources including the SEC database, Market Guide, IPO.com, company websites, news articles, press releases, etc. The information about each person or entity is arranged in a parsable record having a number of data fields. Identification information of the person or entity is input into an appropriate data field. The identification information input into the various data fields includes the name of the person or entity, the address of the person or entity, the person's position in the company, the person's dates of employment with companies the person has worked for, the ticker symbol of the company, the SIC code of the company, etc. Preferably, the majority of the information is obtained through an automated process, such a web crawler, that searches the internet, extracts the appropriate data and inserts the data into the data fields to construct a record of the person or entity. Information not accessible to the automated process is input to the system manually. In this step, relationships between parties may be identified and links between related records established and saved in the database. This enables connections between parties to be included in the records of each party. This step may be repeated as often as necessary to keep the database updated.

In step 24, the client database 114 is constructed. First, the contact data included in the company database 110 is exported to the company list 112, and irrelevant contacts, such as personal contacts and non-business contacts, are eliminated. Redundant contacts are also eliminated. The company list 112 is input to record matching engine 104 where it is compared to the records included on host operation system and database 102. All contacts in the company list 112 that are also included in the host database 102 are stored in the same record form as the host database contacts and these records are saved in client database 114. This step may be repeated as often as necessary to keep the database updated. Accordingly, the data stored in the client database 114 is a subset of the data stored in host database 102. Known relationships between records in the client database 114 can be determined at this point and links between the related records implemented into the records. The information stored in the client database is proprietary to the client and is not accessible by outside parties. Contacts in the company list 112 which are not already on the host database 102 are not saved in the client database 114, since these contacts will not lead to further contacts on the host database 102.

Once the party records have been constructed and stored in the client database 114 and the host database 102, the process of determining connections between parties (people and/or entities) can be executed. In step 26, the host operation system 102 receives identification information of the source party and the target party, which typically are the names of the person or entity, from the client interface 116 of the client system 16 through a connection with the host system 12 via the internet 18. The record associated with source party is then located in the client database 114 if it is stored there. If it is not, it is located in the host database 102, step 28. The record associated with the target party is also located in either the client database 114 or the host database 102. In step 30, the records in the client database 114 and host database 102 are searched by the host operation system to locate commonalities between the identification information in the data fields in the source party record and identification information in the data fields of the records stored in the databases. All intermediate party records which include commonalities with the source party record are identified as first stage intermediate party records. If relationship links between parties within the client database have been previously established, these links are used to locate the connections between the source party record and the first stage intermediate party record. The identification information in the data fields of the first stage intermediate party records are then compared to the identification information in the data fields of the target party record to locate first stage intermediate party records having commonalities with the target party record, step 32. If none of the first stage intermediate party records have any identification information commonalities with the target party record, step 34, the records in the databases are searched to locate further stage intermediate party records having identification information commonalities with the first stage intermediate party records, step 36. The identification information in the further stage intermediate party records is searched to determine if there are any commonalities between any of the data fields in the further stage intermediate party records and the target party record, step 32. Steps 32 through 36 are repeated until an intermediate party record is located which has identification information commonalities with the target party record. When this occurs, the host operation system 102 generates a list of the parties connecting the source party to the target party, step 38, and transmits the list to the client interface 116 via the internet 18. If a preset limit, which limits the number of unique connections found to a predetermined number, which may be set by the client when entering the source and target party information or by the host operation system, is met, step 40, the process ends. If the preset limit is not met, steps 32 through 36 are repeated until the preset limit number of unique connections is met.

Figure 5:
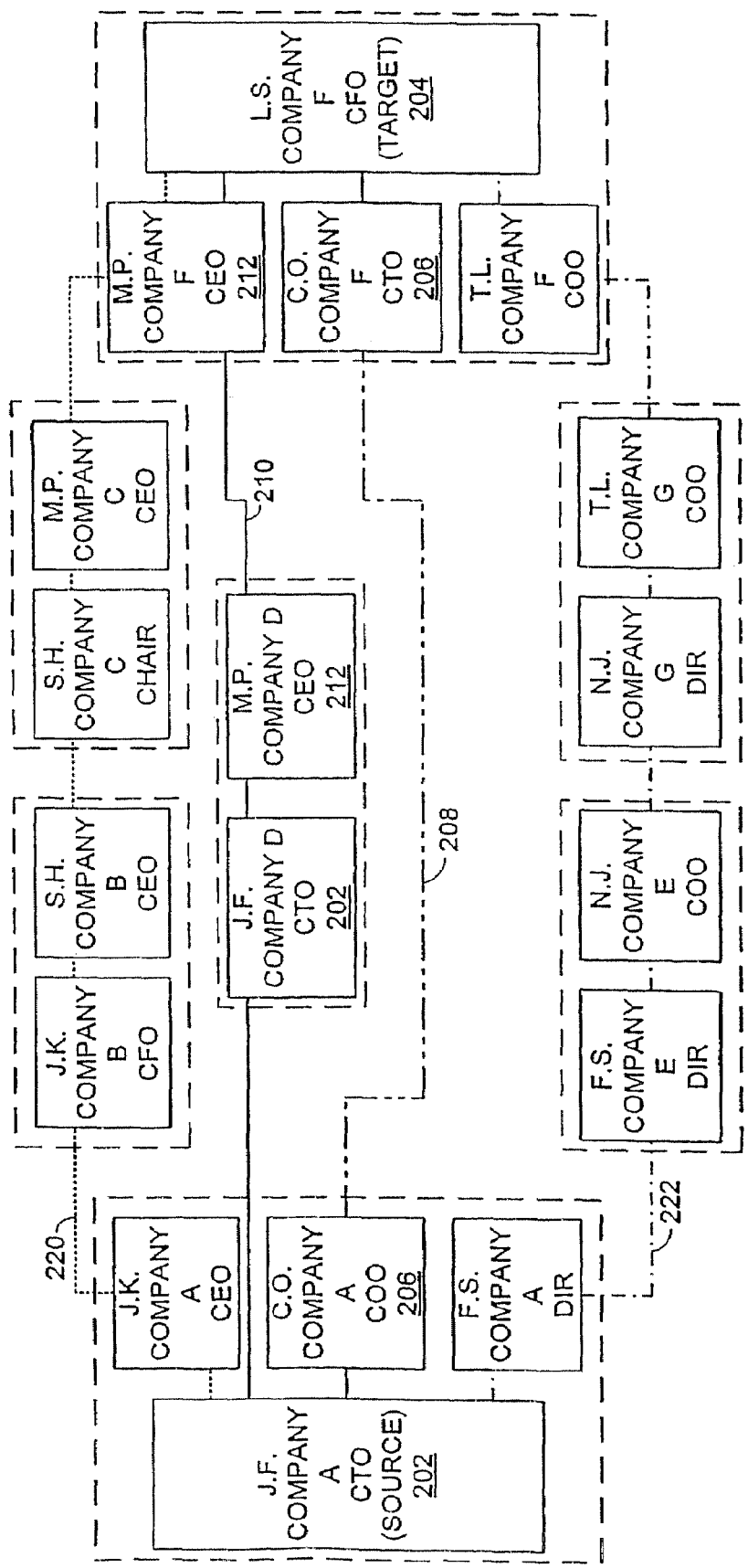
FIG. 5 is a schematic diagram showing a list of connections determined according to the present invention.

An example connections list is schematically shown in FIG. 5. In this example, after the host database 102 and the client database 114 have been constructed, steps 22 and 24, FIG. 2, identification information for a source party 202 and a target party 204 are input to the host operation system 102 over the internet 18 through client interface 116. For simplicity, the entire record of each party is not shown in FIG. 5. Only the relevant identification information for the purposes of this example are shown. Upon receiving the identification information, which typically is the name of the people between whom a connection is to be determined, the records of the source party and the target party are identified in the client and/or host databases, step 28. In this example, the source party 202 is for J.F. who is the Chief Technology Officer of Company A. The target party record 204 is for L.S., the Chief Financial Officer of Company F. In step 30, the host database 102 is searched to locate intermediate party records having identification information commonalities with the source party record 202. In this case, the record 206 of C.O., which indicates that C.O. has identification information including a relationship with Company A as Chief Operating Officer is located. The remaining identification information of the record of C.O. is searched to determine whether there is a commonality between any of the identification information of C.O. and any of the identification information stored in the record of the target party, L.S., step 32. There is a commonality, since the record of C.O. indicates a relationship with Company F as Chief Technology Officer, step 34. Accordingly, a list including the source party record of J.F., the intermediate party record of C.O. and the target party record of L.S. is generated and sent to the client interface 116, step 38. In the list, all of the identification information included data included in the record of each party is available to the client.

Figure 6:
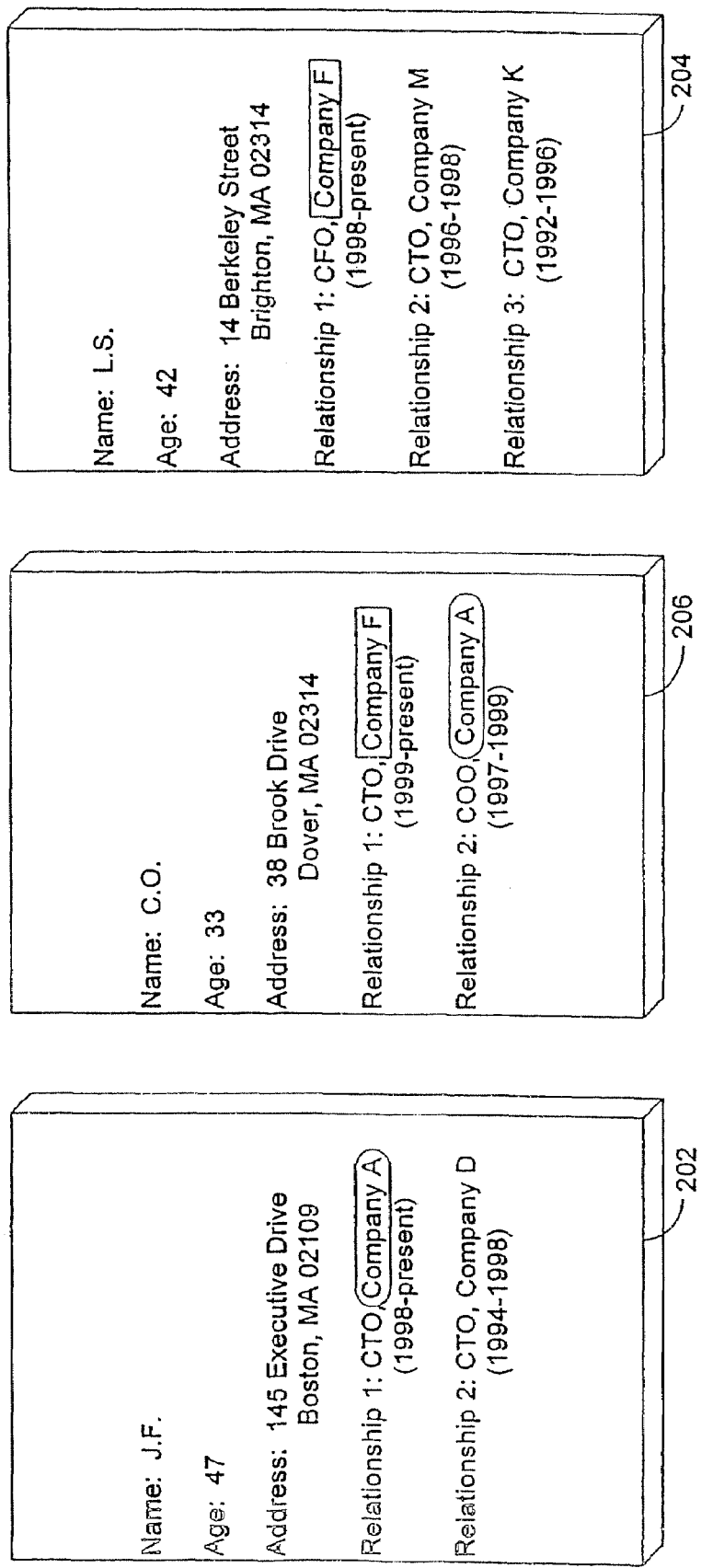
FIG. 6 is a more detailed schematic diagram of records of the parties involved in one of the connections shown in FIG. 5.

A more detailed view of the source party record 202, the target party record 204 and the intermediate party record 206 is shown in FIG. 6. As shown in the figure, the records 202, 204 and 206 include data fields listing identification information such as the name of the person, age, address and relationships to entities such as companies, association, etc. In the example, the commonality between the source party record 202 and the intermediate party record 206 found in step 30 is that both J.F. and C.O. have a relationship with Company A: J.F. as the present CTO and C.O. as a former COO. In step 32, the commonality between the intermediate party record 206 and the target party record 204 is located, namely the relationship of both parties with Company F. As shown in record 204, L.S. is the present CFO of Company F and C.O. is the present COO of Company F.

In FIG. 5, each entity with which the involved parties are associated is indicated by a dashed line. Connections between entities are referred to as hops. Since no entities other than the entities associated with the source party and the target party are needed to make the connection shown by double-dotted, dashed line 208, this connection is referred to as a "one-hop" connection. Other, multiple hop connections between the source party record 202 and the target party record 204 are shown in FIG. 5. Line 210 shows a "two hop" connection. Using the method described above, it is determined that the record of the source party J.F., 202 indicates a relationship between Company A and Company D based on the commonality that J.F. is associated with both companies. A further search in host database 102 indicates a relationship between the record 202 of J.F. and the record 212 of M.P., based on the commonality that both parties have a relationship with Company D. The record 212 of M.P. indicates a relationship with the target record 204 of L.S., based on the commonality that both parties have a relationship with Company F. Accordingly, since one intermediate entity (Company D) is included in the connection 210, this connection is referred to as a "two-hop" connection. Three-hop connections are shown by dotted line 220 and dotted dashed line 222. In this example, if the preset limit of connections is four, in step 40, FIG. 2, the process would end. It will be understood that the preset limit can be set to any number, although, in order to minimize processing time and cumbersome connection lists, the limit preferably is set to no more than 10.

While the example described above shows how connections between two people are generated, the system also determines connections between a person and an entity, such as a company or association; between an entity and a person; and between two entities. Upon constructing the client database 114, a record of the client entity is generated and stored in the client database 114. The host database 102, when being constructed, generates records of entities found in its search of the non-restricted sources in the same manner as the records for people described above. An example entity record 230 is shown in FIG. 7. As shown in the figure, entity record 230 comprises a number of data fields including identification information of the entity, including the entity name, ticker symbol, address and a list of its executives. When an entity is the source party and/or the target party, the same process shown in FIG. 2 is carried out, meaning that intermediate records, which may include records of people or entities, are located which include identification information which is common to the source and or target party records.

In an alternative embodiment, the host operation system and database 102 and the record matching engine 104 are replicated on the client database 114. In this embodiment, all of the operations described above are executed on the client system 16, thus allowing all execution to be local to the client system 16. Furthermore, the system 10 can be utilized to construct a list of connection that are associated with a single party. By inputting a single party to the host operation system and database 102, the searching function described above is executed and, in a first iteration, all records including identification information having commonalities with the source party are located and displayed. Depending on the scope of connections desired, numerous iterations of the search function can be executed in order to locate records of parties connected to the parties located in previous iterations.

While, as described above, the system 10 may be utilized by clients having a proprietary client database, it can also be utilized by a party which does not construct its own database. This process is shown in the flow diagram 240 of FIG. 3. In step 250, the user system 14, FIGS. 1 and 4, establishes a connection over the internet to the host system 12. The user system then enters the source party and the target party, step

252. The host operation system 102 identifies the records associated with the source party and the target party in the host database, step 254. Once the source party record and the target party record are found, steps 256 through 266 are executed, which are identical to steps 30 through 40 shown in flow diagram 20 of FIG. 2.

Accordingly, the present invention enables connections between people and entities to be determined using a convenient and efficient database construction and search tool. The invention is able to provide information about connections between parties based on commonalities in the identification information associated with each of the people and entities. The system can also be used simply for browsing through connections between parties and for obtaining the identification information associated with the record for a particular party. While the application has been described in connection with an example using businesses and business people as the parties, it will be understood that any party could utilize the connection-determining feature of the present invention and be the subject matter, including schools, civic groups, churches, organizations, associations, families, agencies, neighborhoods, etc., and the people who populate such groups.

Client Link and Private Link

The system described above may also include the various features and capabilities described below, which enable a client (i.e., a user of host system 12) to generate a list of persons or entities (including groups of persons or groups of lists) that can function as a starting point for a connections query or request. This functionality can be referred to as "ClientLink™" (a trademark of Orion's Belt, Inc.) and made integral with or a separate module that works in concert with host operation system 102. A user's personal or private list created using ClientLink can be referred to as the user's "PrivateLink™" (a trademark of Orion's Belt, Inc.) or "PrivateLink list". For purposes of this description we assume that ClientLink is integral with the host operation system 102 of FIG. 1.

As a general overview of a host operation system 102 having aspects of PrivateLink, when the connections server and DB (or host system 12) receives a query including a PrivateLink list and an endpoint, the host operation system 102 generates information representing the connections to the endpoint for each member of the PrivateLink list, and returns this to the user. In other forms, rather than a single endpoint, a list of endpoints could be used (i.e., an endpoint list). In such a case, the host operation system 102 generates connections between each member in the PrivateLink list and each member in the endpoint list, to the extent such connections exist. In yet another form, a user may enter a single starting point and an endpoint list. In such a case the system generates connections from the starting point to each endpoint in the endpoint list, to the extent such connections exist. The following text describes these features more fully.

In this embodiment, host operation system 102 comprises several components:

A. host operation system database—which comprises information derived from public-domain sources about people and entities with which they are associated (current and past)

B. host operation system application—which comprises software to extract and parse relevant content from a variety of sources, coupled with connection algorithms to search for and identify linkages between people and/or entities, and C. ClientLink—which provides a secure mechanism for clients to link their confidential contact information with host operation system 102 (or host system 12).

The host operation system 102 including ClientLink includes a function called Connect that allows clients (or users) to specify both the desired endpoints of a connection—people, entities or PrivateLink list—and the degrees of separation. It may also provide for an enhanced graphical display and allow filtering according to the presence of specific people or entities in the connection paths (e.g., only show links with Michael Jordan in the path).

Other optional features include functions to:

A. develop metrics to rank connections according to their probable value,

B. permit the user to assign a personal weighting factor to connections, and

C. display connections in priority order.

ClientLink allows clients to integrate knowledge about their own connections and networks of relationships with the host database 102. For a multi-user subscriber, ClientLink can incorporate sophisticated permission protocols for controlling access to information by individual users. Users can indicate the existing people and entities in the host database 102 with which they have relationships. Additionally, the host operation system 102 can enable users to "fill in the blanks" with ClientLink, i.e., add additional information about relationships between people and entities. All of the ClientLink information is preferably kept proprietary to the specific subscriber.

Browse is a function that displays first-order relationships for a specified person, entity or PrivateLink list. An optional feature, "Explore", allows the user to easily determine concentric, expanding relationships radiating out from a central ending point, whether a person or an entity. Extended Browse capabilities allow searching along a number of parameters such as functional position (e.g., CEO) or education (e.g., MIT alumni).

ClientLink Integration

Synchronizing each customer's PrivateLink list or data with host operation system 102 is the process whereby names in a user's contact list are matched to names in host operation and system database 102. Then, client subscribers can connect from their personal or corporate contacts to the decision-makers in host database 102.

The host operation system 102 can accommodate this synchronization through a variety of mechanisms, including by using plug-ins for popular Customer Relations Management (CRM) and contact management systems to customized extraction.

ClientLink

As mentioned above, ClientLink is the feature that links a client's own contacts (e.g., customers, referral sources, vendors, etc.) 850 with the host database 102 (or connections) in order to produce the most effective links for each client. This feature allows a user to specify in a database 856, in advance, the people 852 or entities 854 in the host database 102 which are to be used as sources for a connection, thus eliminating the need to specify a unique starting point for each connection request.

An individual user's list 860 can be part of a group, and connections can be requested using groups as a starting point. This feature allows client users to request connections from their own or from their colleagues' contacts, depending on the flexibility of each client's protocols regarding access to lists. In the host operation system 102, a user's ClientLink list is called a PrivateLink list. Client administrators have wide latitude in setting up groups, so that connections can be requested from an office, a region, a practice, or an entire organization. Security protocols prevent any client from accessing another client's ClientLink data.

ClientLink can be customized for each client, e.g., during its installation. This includes, for example, determining the most effective way to make existing contact lists (e.g., from common contact management or CRM products) accessible by the host operation system 102, identifying client protocols regarding users' lists, and working with the client administrator to establish the group/list structure.

Users can populate their PrivateLink list, e.g., at the time of installation, by extracting data from their current contact lists, or they can manually enter data into their PrivateLink list as they use host operation system 102.

Technology

One embodiment of the technology in ClientLink includes two overall components, as discussed in detail above:

A. Data-collection—integrate data from multiple sources, verify, and load into the host operation system and database 102

B. Connection-finding—search for links between people or entities and graphically display the results Its components are linked in an overall information architecture 800, shown schematically in FIG. 8A.

Data-Collection Technology

The host database 102 contains information about entities, people, and the relationships among them:

Entities—companies and other organizations (e.g., "IBM")

People—individuals (e.g., "Louis V. Gerstner, Jr.")

Relationships—an affiliation and associated time period (e.g., "CEO from 1993")

This information is derived from publicly available sources 802 (offered either free or by subscription) by a combination of automated methods with minimal manual intervention. The host database 102 is populated via a four-step process:

1. a web crawler 804 downloads information from public web sites 802 or SEC filings 806, identifying information in headings and tables;

2. a proprietary parser 812 (discussed below) analyzes the data and assembles information about entities, people, relationships, and dates;

3. a data loader transfers this information into the host database 102; and 4. continuing updates keep the database current.

Web Crawlers

Web crawlers 804 are generally known in that art, and are used here to find and collect data about entities and the individuals associated with them. This data can be found at company web sites, SEC filings, executive biographies 808, structured person-entity relationship data sources 810, and a variety of other sources, such as press releases. This data gathering process uses a combination of readily available tools (e.g., Wget) and ad-hoc host operation system software. The Web crawler can identify some kinds of data relevant to host operation system 102 by its relationship to headings and tables on the HTML page.

Parser

For public corporations, the most useful sources of information—such as SEC filings 806 or company web sites— generally contain "Executive Biographies" 808, biographical paragraphs that provide background and supplementary data about each person associated with a particular corporation. These paragraphs are analyzed by a collection of computer programs called the "parser" 812 to identify entities, people, and relationships among them. An example of a paragraph from an SEC filing for the TALX Corporation is shown below:

"Mr. Canfield has been President and Chief Executive Officer and a director of the Company since 1986 and has been Chairman of the Board of Directors since 1988. He had earlier become Chairman of the Board of EKI, Incorporated ("EKI"), which was acquired by the Company in fiscal 1994. For approximately 10 years, Mr. Canfield was President of Intech Group Inc. ("Intech Group"), until its acquisition by the Company in 1996, and from 1985 through 1989, Mr. Canfield was Chairman, and a principal shareholder of Noetic Technologies Corp., an engineering software company which was purchased by MacNeal-Schwendler Corporation in 1989. Prior to that, Mr. Canfield was one of two founders of Financial Data Systems, Inc. which was started in 1968. In 1980, the company, which provided services and turnkey systems to savings banks, was purchased by Citicorp. Mr. Canfield is a director of Jefferson Savings Bancorp, Inc. Mr. Canfield holds a Bachelor of Science degree in Electrical Engineering from Purdue University and an M.B.A. degree from Washington University."

First, the parser 812 partitions the paragraph into separate sentences. Then, the parser 812 identifies entity names, people names, positions, and dates using a set of recognizer programs. Some of these elements are recognized heuristically (e.g., dates) while others are recognized by a combination of heuristics and by looking them up in a pre-defined list (e.g., entity names). The parser 812 can have a list of more than 64,000 entity names, entity name variants, and aliases (e.g., GE for General Electric Corporation).

Finally, the parser 812 matches sentences containing recognized elements against a list of content patterns. If it finds a match, it uses the entity and position or title specified in the sentence to generate a corresponding relationship between an entity and a person. This relationship may also have start and end dates, if these were present in the sentence. If the parser 812 cannot find a match between a sentence and its list of patterns, it creates a candidate pattern based on the sentence structure, but does not create a relationship. Instead, it records both sentence and candidate pattern to a log file for human review and, where appropriate, for manual input.

The parser 812 used in this embodiment can analyze about 90 sentences per second and takes about two hours to process all public companies listed on the NYSE, NASDAQ and AMEX exchanges. Currently, the parser 812 accepts about 30% to 40% of the information it encounters in free-text format. The acceptance rate will rise as the number of content patterns is increased, but it is unlikely to ever reach 100% with the techonology presently available; perhaps 60% to 75% is a realistic goal for well-written biographical paragraphs. The accuracy of the parsed data is very high—around 95%. Because of the high specificity of the parser 812, it will be able to identify and extract correct relationships when they are mentioned in bodies of text where much of the content is on another topic (e.g., from press releases).

Some sources of data may be of such syntactic complexity or poor grammatical quality that the acceptance rate may be much lower. Even for well-written sources, however, eventually it could reach a point of diminishing returns, where the effort required to analyze sentences programmatically will exceed the effort required to do so manually. But improvements in processing technology could result in significant increases the acceptance rate. However, where there are remaining sentences, they can be analyzed manually. Experience to-date suggests that larger, public companies tend to have better-written biographical paragraphs. These companies were the first priority for loading into the host database 102.

Data Load

When the parser 812 has completed its work, the resulting output undergoes a modest amount of mostly automated follow-up processing to:

1. identify and merge records to match up multiple references to a specific person from different sources by the same or closely related names;

2. identify and merge overlapping positions (different source paragraphs may refer to the same position with slightly different dates or with a different wording of the title); and 3. perform a sanity check on the parser output.

The results from parser 812 and any structured person-entity-relationship data 810 are passed to an assembly and merge database 814, which bring the data together, along with any data from licensed data sources 816 and any "data curator tools" 818 provided for accessing data stored within the system or other known repositories. The assembly and merge database ultimately provides a production database 820, which is the host database 102.

As host database 102, database 820 is used by the ClientLink functionality 822 and web site and connect functionality of host operation system 102. The ClientLink functionality 822 can use client (or customer) contact and CRM data, input by the customer 830 to help build the production database 820.

Database 830 (i.e., host database 102) can be generated using computer software to extract information from electronically available data sources, as discussed. Human input can also be used, if needed, to:

1. identify trustworthy information sources;
2. construct and correct errors in the parsing program results and their associated data tables, if any, and
3. review the entity-name list (which is used by the parser 812 to recognize valid entity names).

Update Process

The host database 102 can be kept current in several ways:

1. make corrections and data updates as learned (e.g., from press releases, company web sites, etc);
2. the parsing technology can also compare current data (from our existing sources) against the database 102—if an entity/person/relationship set is in database 102, but no longer in the source, an end date is inserted for that relationship, or if entities, persons, or relationships are found in our sources, but not in the database, they are added to the database; and
3. statistical sampling can be used to verify the accuracy of the information loaded into database 102.

Database updates are preferably done daily, and only allowed from a single system with a secure connection to the database 102. All database changes (corrections, additions, and deletions) can be logged to create an audit trail.

Connection-finding Technology

The connection-related technology includes a user interface for access to the host database 102, and the algorithms required to find and to display connections between people and entities as requested by a user.

Access to Host Operation System

Users access the host operation system 102 via a graphical, browser-based interface by customer 130 (e.g., user 14 from FIG. 1). User requests are transmitted to a web server and thence to an application server, where database queries are converted to SQL and forwarded to an Oracle database engine, in the present embodiment.

Figure 8A:
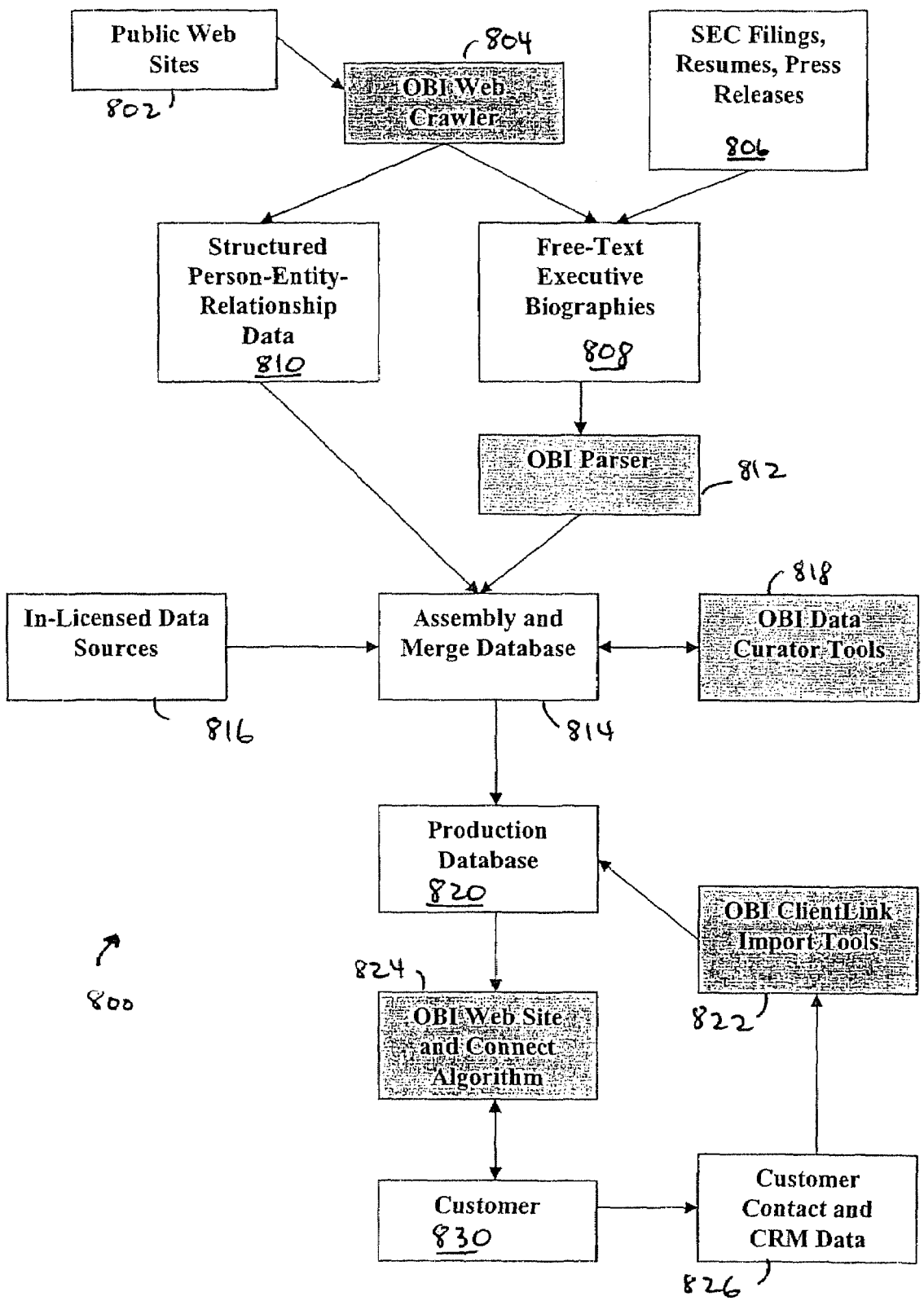
Figure 8B:
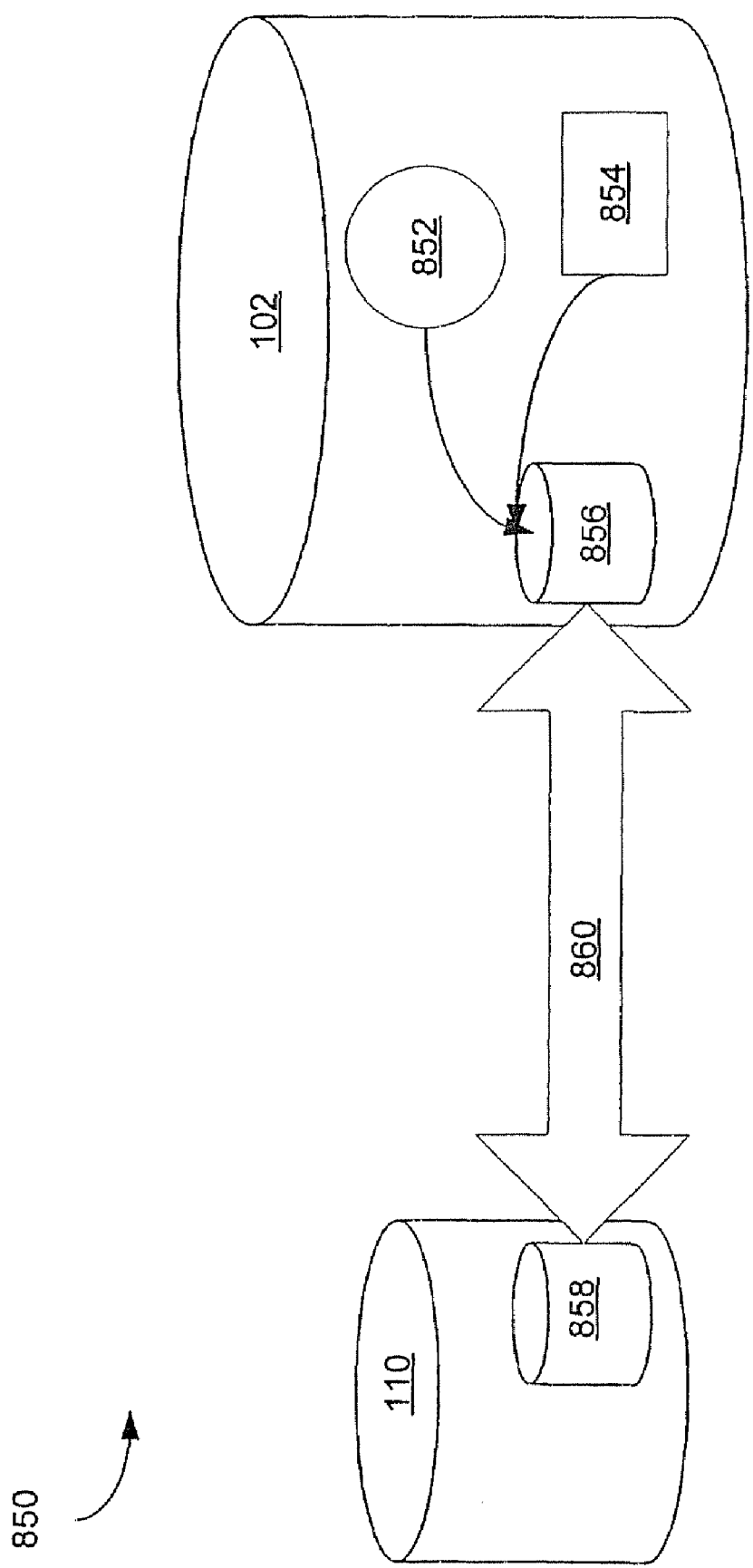

Referring to FIG. 8A, there are three key features available for users, as follows:

1. Connections 824
2. ClientLink 822
3. Browse (by Customer 830)

Connections

Users can ask the host operation system 102 (i.e., DB 820) to find connecting paths between a starting point (either a person or an entity) and an end point (which can also be either a person or an entity). Hence there are four connection possibilities:

1. Person to Person
2. Person to Entity
3. Entity to Person
4. Entity to Entity

For example, suppose a user wanted to know if there was a path between John Phelan (a former chairman of the New York Stock Exchange) and Exxon Mobil Company. After requesting a Person-to-Entity connection, the user is asked to specify the person and the entity, as shown in the screen shot 900 of FIG. 9. Here, the user enters the name of the person, in fields 910 and the name of the entity in field 920. The degrees options 930 specify the number of people allowed between the starting and ending points. Choosing "Connect" button 940 causes the host operation system to generate the requested list.

Figures 9, 10:
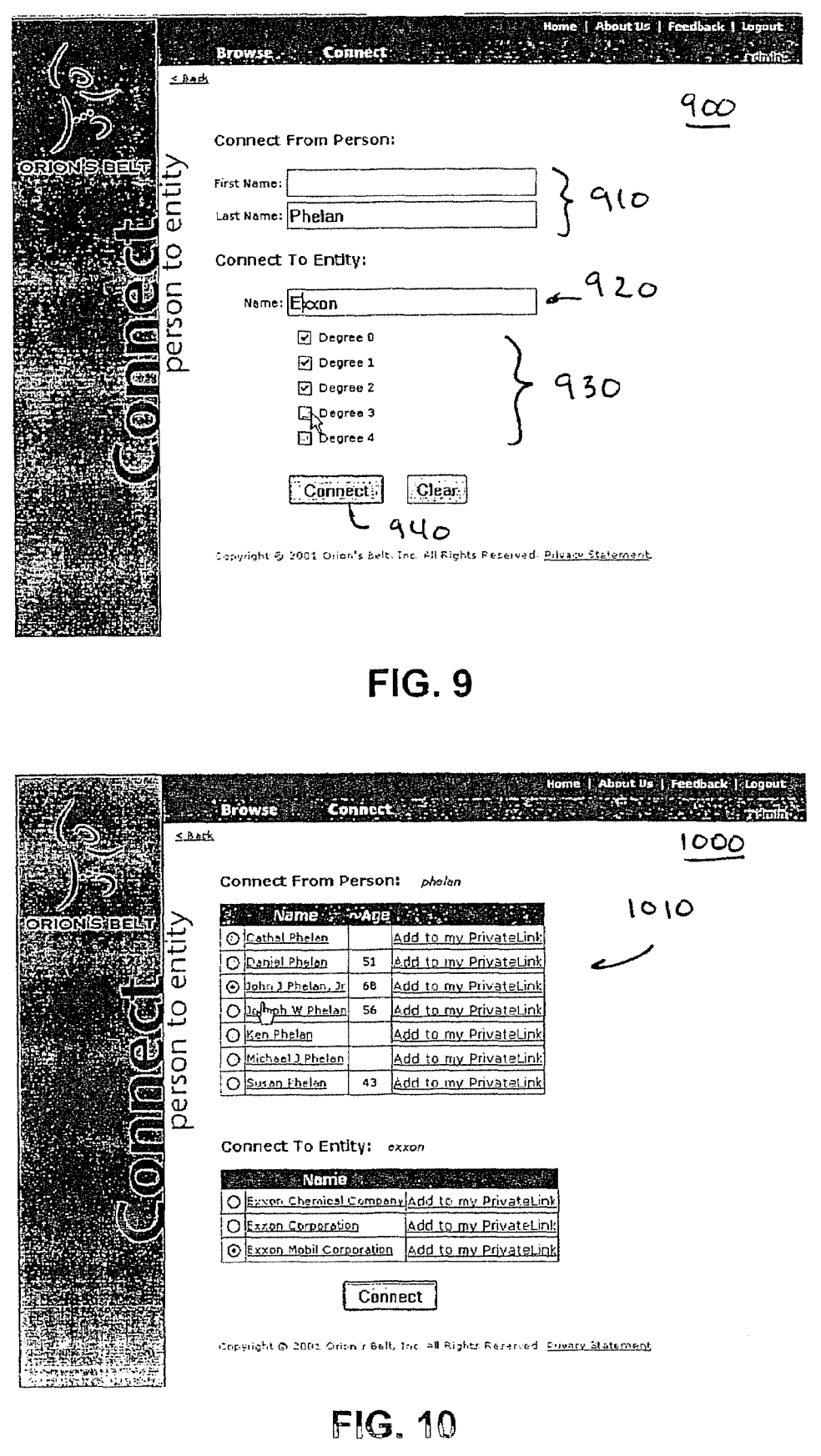

FIG. 10 is a screen shot 1000 that allows the user to uniquely identify the desired person and entity from among several possible candidates in a list 1010 generated when the user selected the Connect button 940 from FIG. 9. That is, the user input "Phelan"s as the last name for the person (end point) in FIG. 9. FIG. 10 shows, in list 1010, that the system included several Phalens in the database. Additionally, list 1020 shows that there were several "Exxon"s in the database. The user can choose one or more from each list 1010, 1020.

Figures 11, 12:
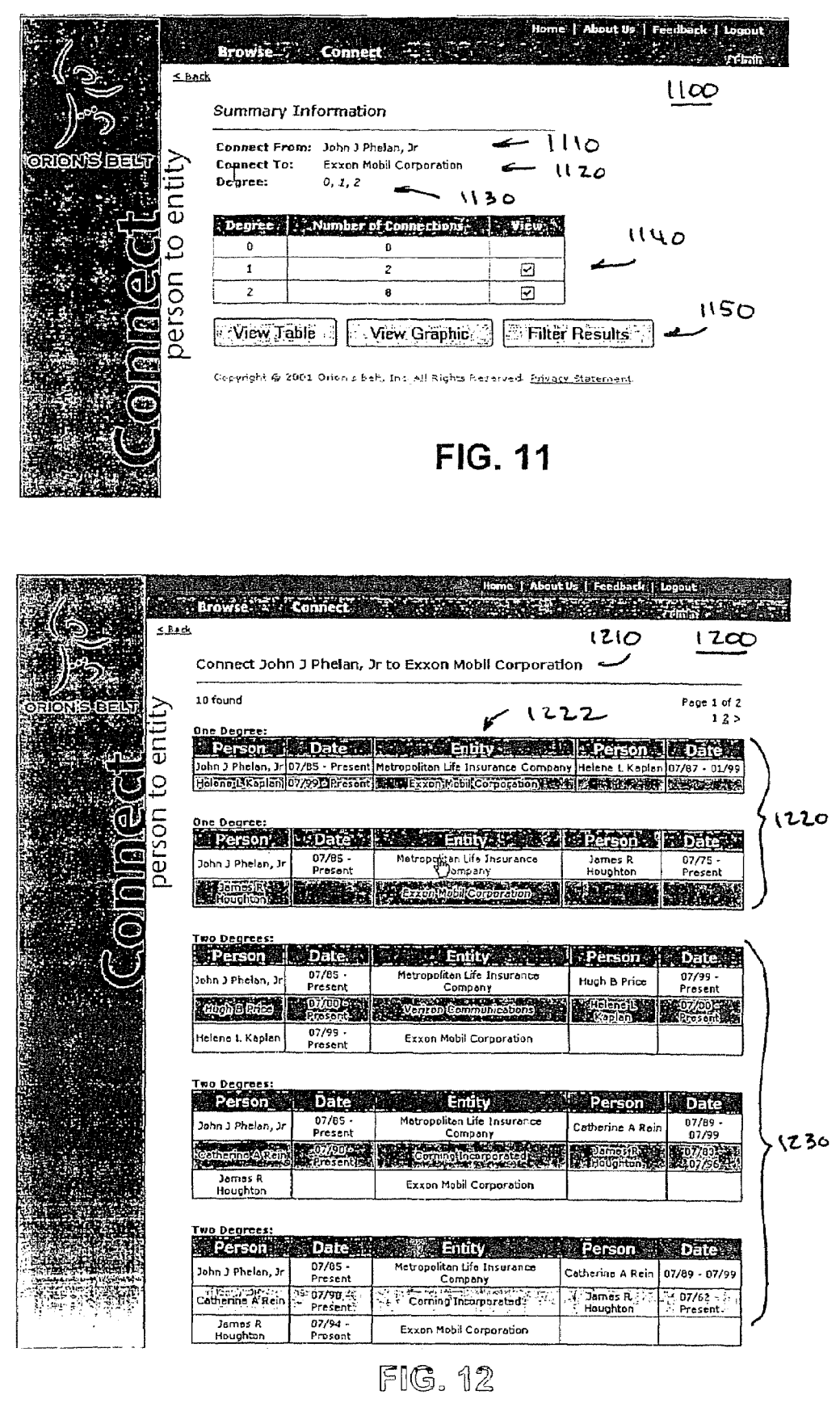

After selecting the particular one or more person and entity desired in FIG. 10, the system searches for possible paths between these starting and ending points, and displays a summary page, shown in the screen shot 1100 of FIG. 11. The summary screen 1100 shows the starting point (or connect from point) 1110 and the ending point (or connect to point) 1120. Screen 1100 also shows the number of degrees 1130, as well. Screen 1100 includes summary table 1140, which is shown with three columns: Degree, Number of Connection and View. The view column includes check boxes to allow the user to select records from the table to view. Summary table 1140 shows that there were 2 connections with 1 degree (or hop) and 8 connections having 2 degrees (or hops).

Figure 15:
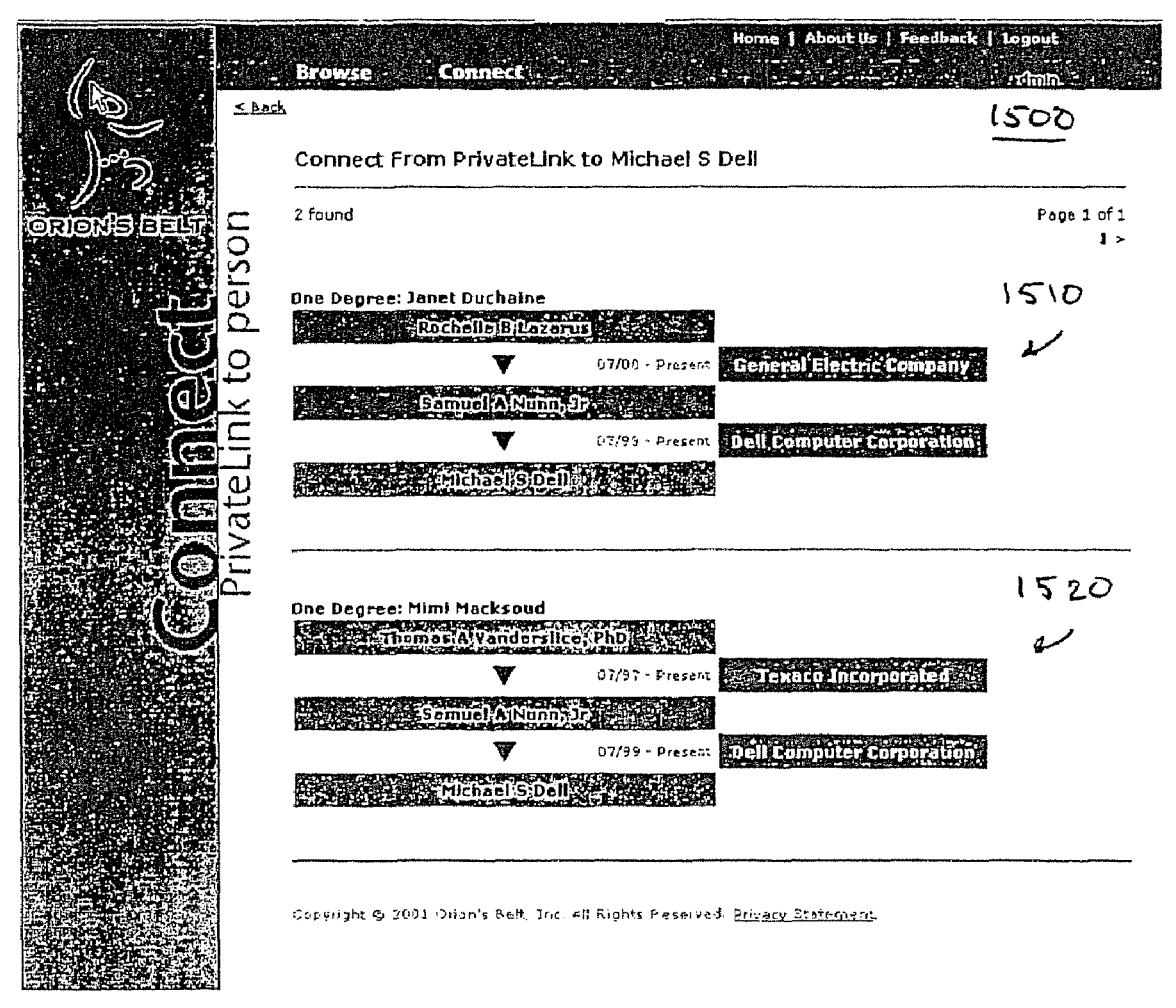

Screen 1100 also includes three buttons 1150: View Table, View Graphic, and Filter Results. The Filter Results button allows the user to filter the results, which is valuable when a large number of connections are returned. The View Graphic button generates a screen that depicts the connections graphically, as demonstrated in FIG. 15, as an example. Selection of View Table generates screen shot 1200 of FIG. 12. At the top of the screen 1200, a person and entity identifications 1210 are provided. The results have been listed beginning with all 1 degree connections 1220, then 2 degree connections 1230—presuming that the 1 degree connections may be, at least in initially, of the highest interest. Each connection is identified by a sub-table, where each row is a record for a person or entity. For example, sub-table 1222 shows John J. Phelan, Jr. being associated with Metropolitan Life Insurance Company, which is in turn associated with Helen L. Kaplan. In the second row of sub-table 1222, Helen L. Kaplan is associated with Exxon Mobile Corporation. As a result, John J. Phelan, Jr. as a link to Exxon Mobile Corporation.

Within the host operation system 102, a user's ClientLink list is called a PrivateLink. Users can request connections from their PrivateLink to either a person or an entity. An example is shown in the screen shot 1300 of FIG. 13, requesting a connection from a JSM's PrivateLink list (or "JSM's List 1310) to Michael Dell of Dell Computer Corporation. JSM's List is shown belonging to a group in field 1320, called "Orion's Belt". Together, fields 1310 and 1320 define the "Connect From" entry. To define the "Connect To" entry, there is provided input boxes 1330, into which the name Michael Dell has been entered. As before, a set of degrees boxes 1340 is provided to allow the user to set limits on the search as a function of the number or intermediate connections (or hops) between the "to" and "from" points.

Figure 13:
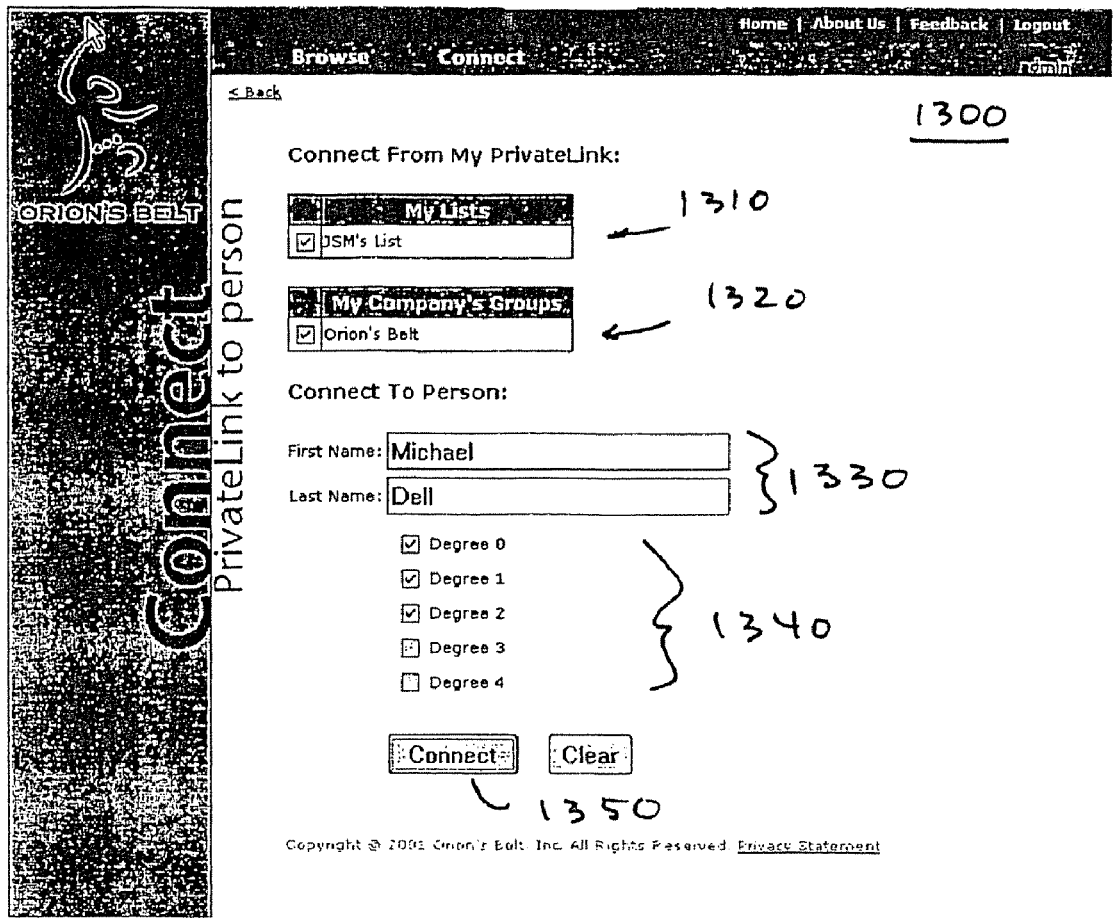

Selection of the Connect button 1350 of FIG. 13 causes the system to generate the screen shot 1400 of FIG. 14. Screen shot 1400 is a summary display that shows the "owners" of the lists that have connections. The user can avail themselves of both their own and their colleagues' connections to maximize the likelihood of finding a reasonable link to a designated destination. A user's ability to access PrivateLink lists other than his or her own is determined by the client administrator. This particular example shows how a number of people in the selected group (see FIG. 13) can make use of their colleagues' lists to find the best path to the desired end-point (here Michael Dell). In these tables, the name of the list (or List Name) is provided in the first column and the name of the List Owner is provided in the second column. The #Results column shows the number of lists with connections to the end point. If there is a "0" result, there is no opportunity to select View in the final column. As shown in sub-table 1410, JSM's List for 1 degree produced no results, but in sub-table 1420 for 2 degrees, JSM's List produced 4 results.

In sub-table 1410, JLD's List and MMacksoud's List each had 1 result. These were each selected for viewing in the View column. This time, selection of the View Graphic button 1430 produces screen shot 1500 of FIG. 15. Screen shot 1500 displays the connections from within each list, shown using the graphical view. Here, graphic 1510 shows the result for JLD's List from sub-table 1410 of FIG. 14 and graphic 1520 shows the results from MMachsoud's List. Viewing graphic 1510, Janet Duchaine, the owned of JLD's List, connects to Micheal S. Dell view Rochelle B Lazarus (of General Electric Company), which has a connection via Samuel A. Nunn, Jr. (of Dell Computer Company) to Michael S. Dell.

Connection Technology Extensions

Beyond that described above, extensions to the connection technology could be selectively implemented. The connection algorithms look for overlaps between the time periods during which two or more people were associated with an entity. But the connection algorithms themselves have no intrinsic knowledge of people and entities—they actually look for overlaps between entries in a general-purpose relational database. These entries could be, for example:

1. Web sites and their visitors
2. Trucks and their cargo
3. Airline flights and their passengers More generally, entries in the database can represent containers or contents-of-containers, where a content entry is associated with a container entry over some (perhaps indefinite) period of time. Containers can themselves be the contents of other containers.

The connection technology and associated user interface can also be applied to clients' private databases (e.g., a recruiting firm's inventory of potential candidates). Third-party databases can be integrated into the service providing the host operation system, permitting revenue sharing arrangements with established content providers.

Browse

The browse function (shown has a selectable function in FIGS. 9-15, enables a user either to look at people, and the entities with which they are associated, or to look at entities, and the people associated with them. The browse function can be invoked at any time during the connection process; there is also a separate browse function on the main menu. The browse function can be extended to include an "explore" function, which begins with the endpoint (person or entity) and display progressively larger circles of contacts, so that the user might look for known contacts.

ClientLink

Figure 16:
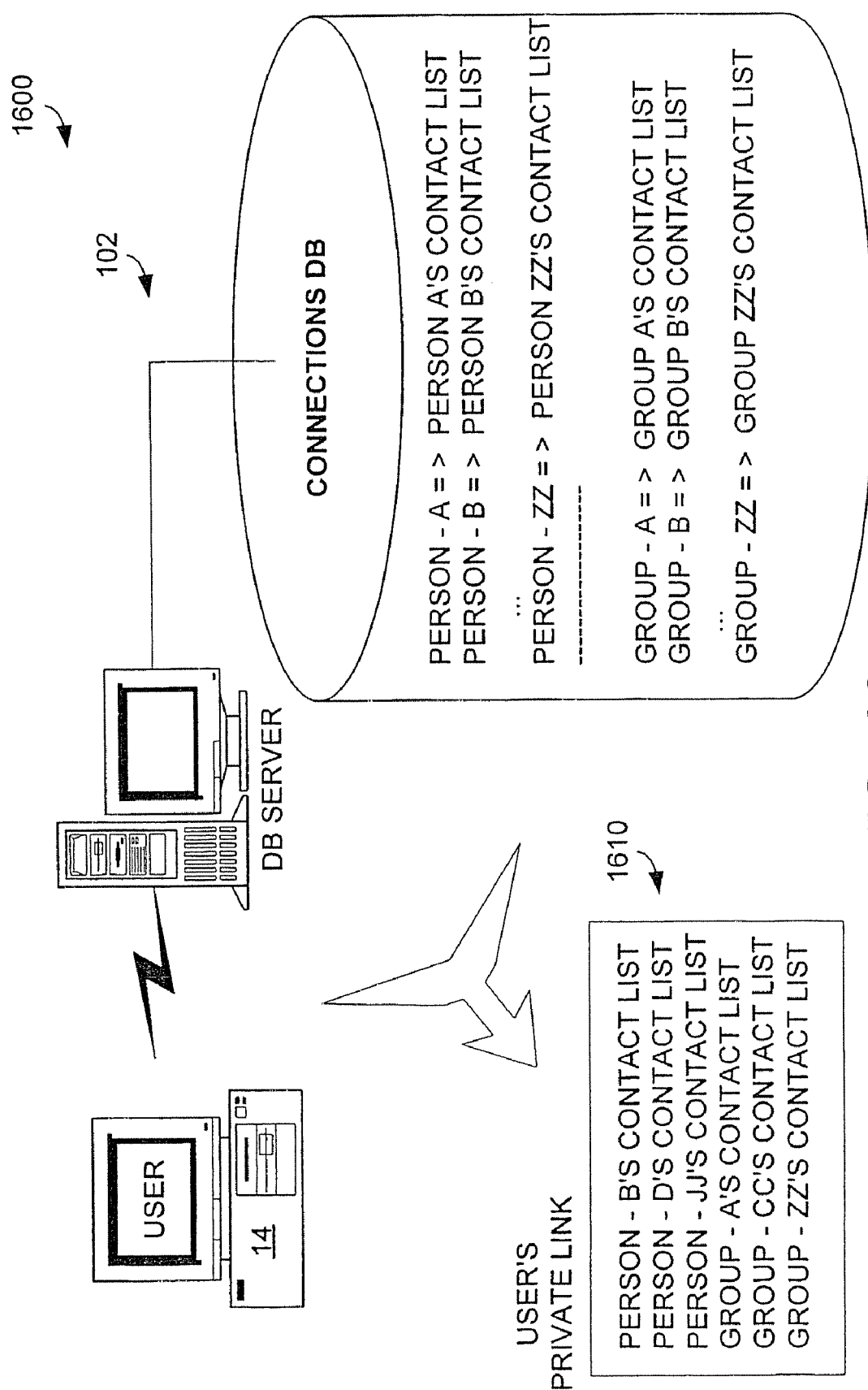
Figure 17:
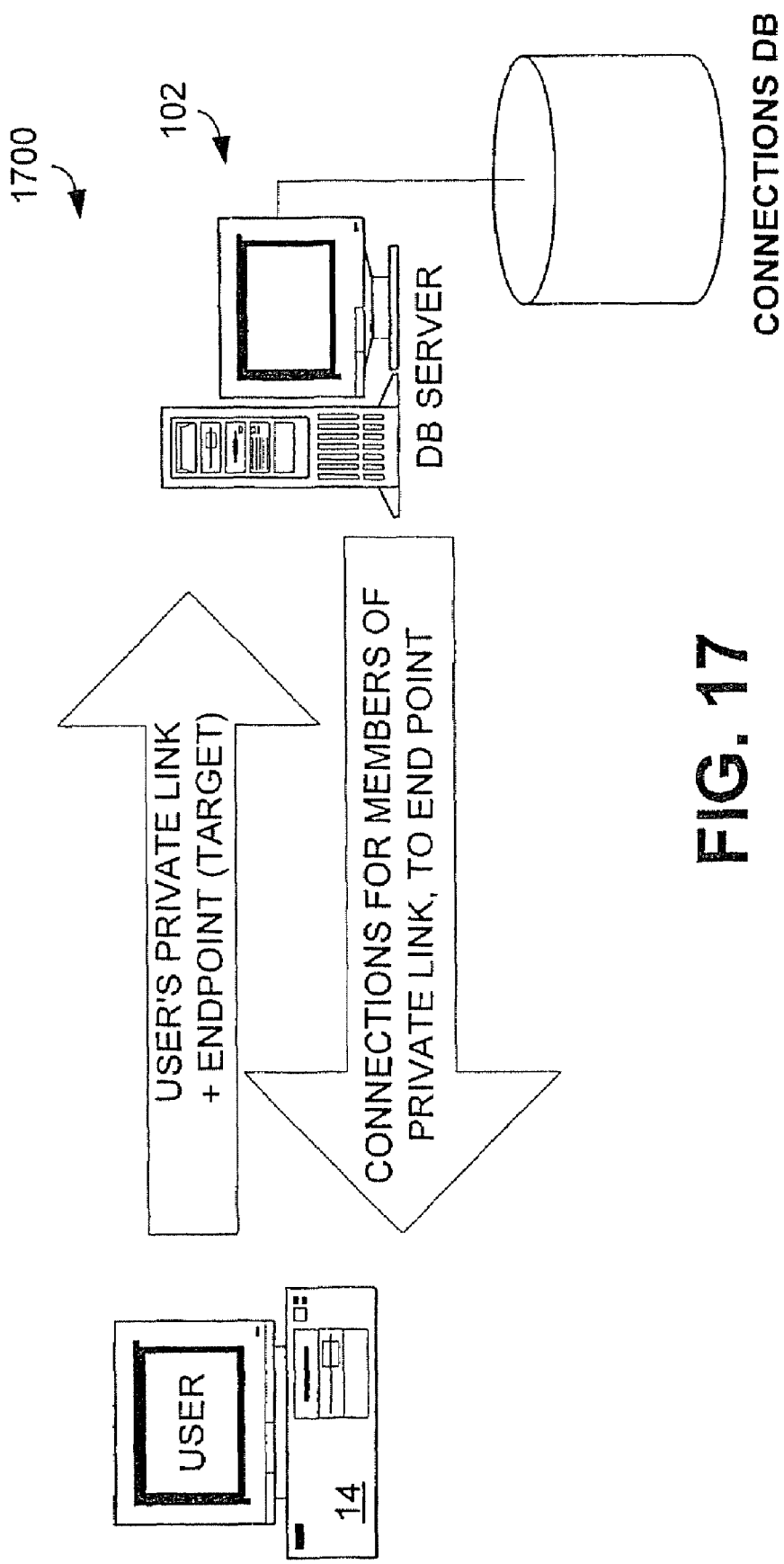

ClientLink may also be further appreciated with respect to FIGS. 16-21. FIG. 16 is a top level diagram depicting a PrivateLink implementation, wherein a user's PrivateLink list 1610 can be resident on the connections system, user system, third party system, or some combination thereof. FIG. 16 shows that in either database, a list can include individuals, entities, or groups, or combinations thereof. FIG. 17 is a diagram that shows that when a user sends a target endpoint and PrivateLink, the system 102 returns connections for members of PrivateLink, to end point, which corresponds to FIG. 16.

Figure 18:
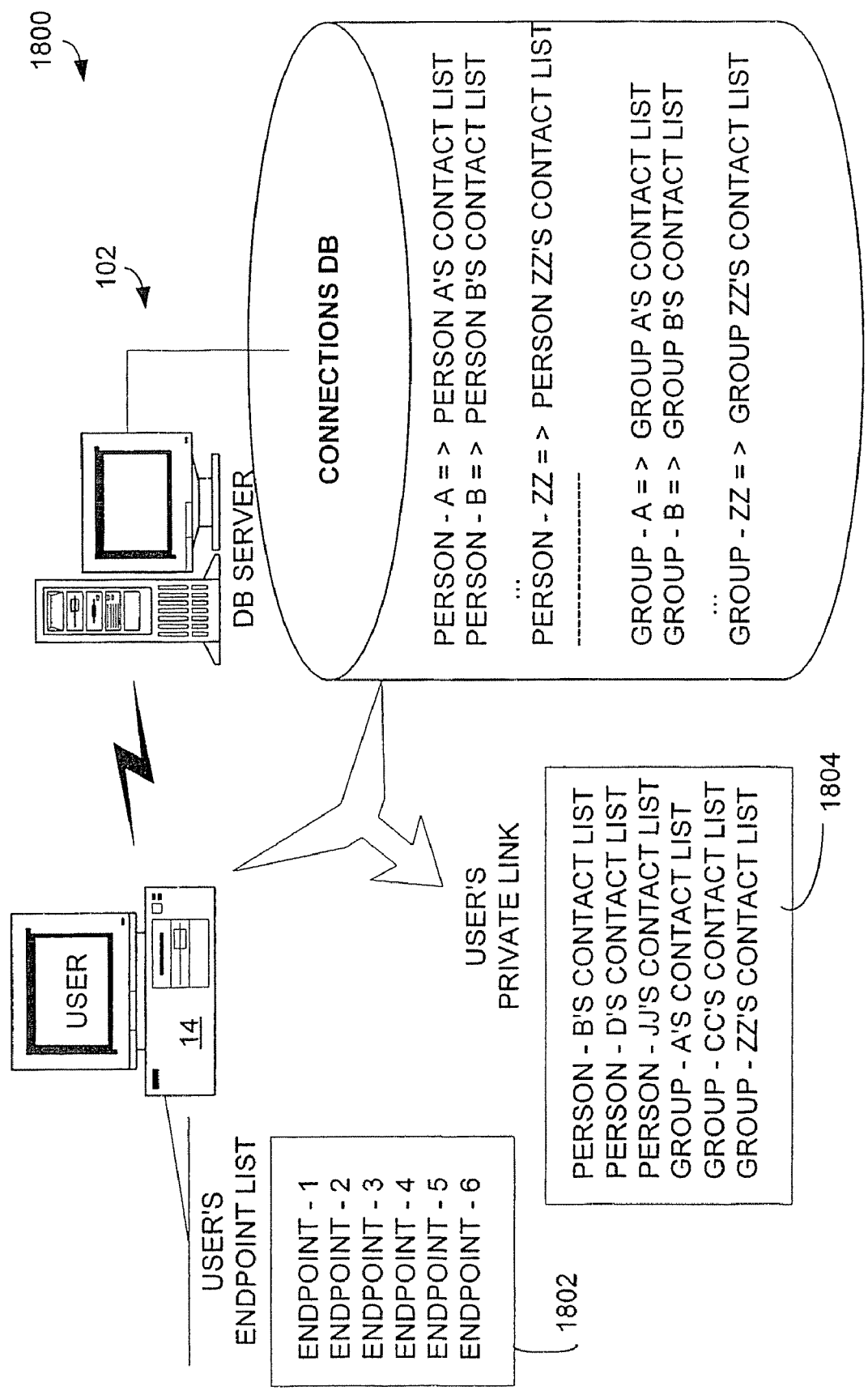
Figure 19:
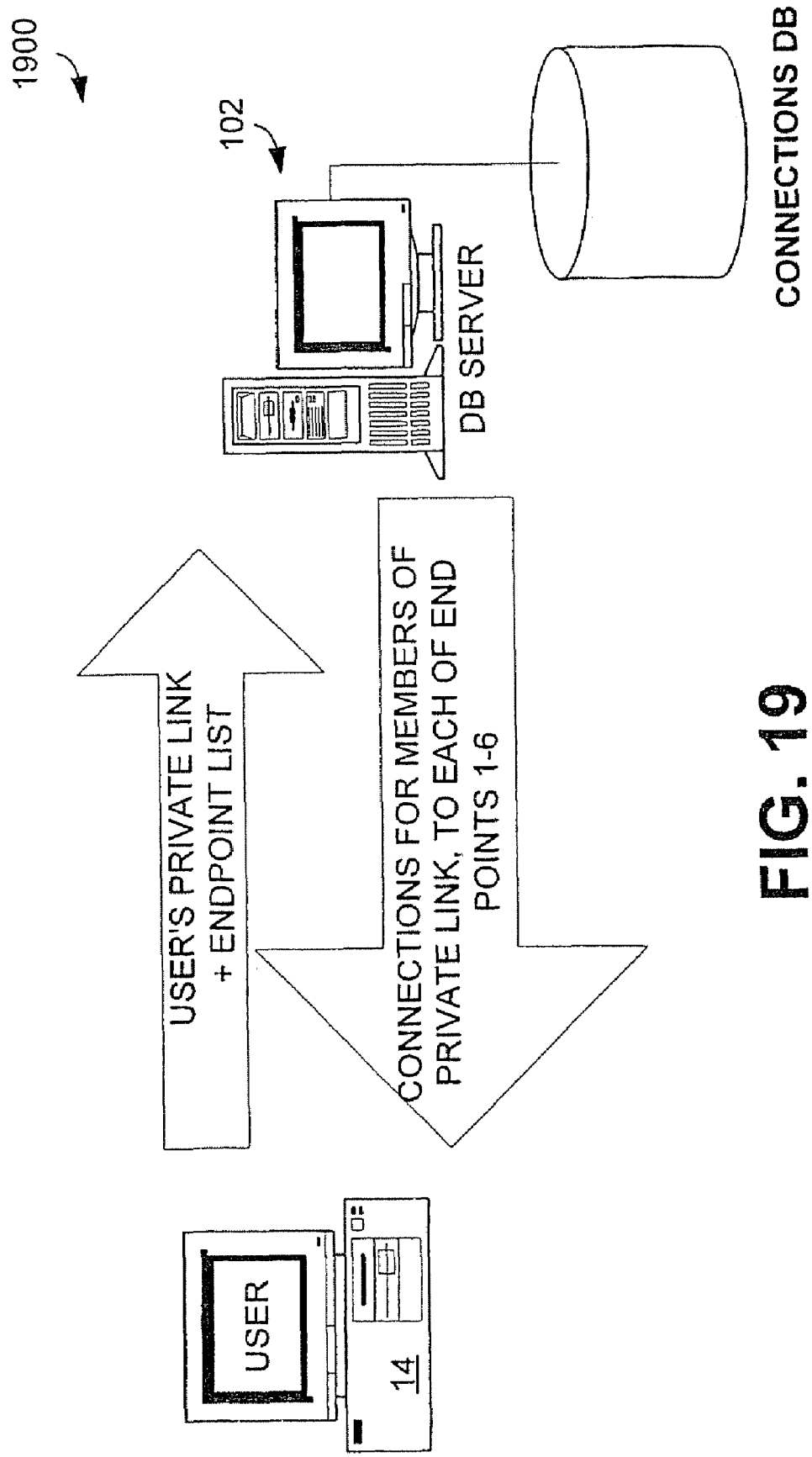

FIG. 18 is a diagram 1800 that shows a PrivateLink list 1804 with an endpoint (or target) list 1802, rather than giving a single endpoint. A user's PrivateLink list 1804 and endpoint list 1802 can be resident on the connections system 102, user system, third party system, or some combination thereof. FIG. 19 is a diagram 1900 that shows a query and results process when using a PrivateLink list with endpoint list, which corresponds to FIG. 18.

Figure 20:
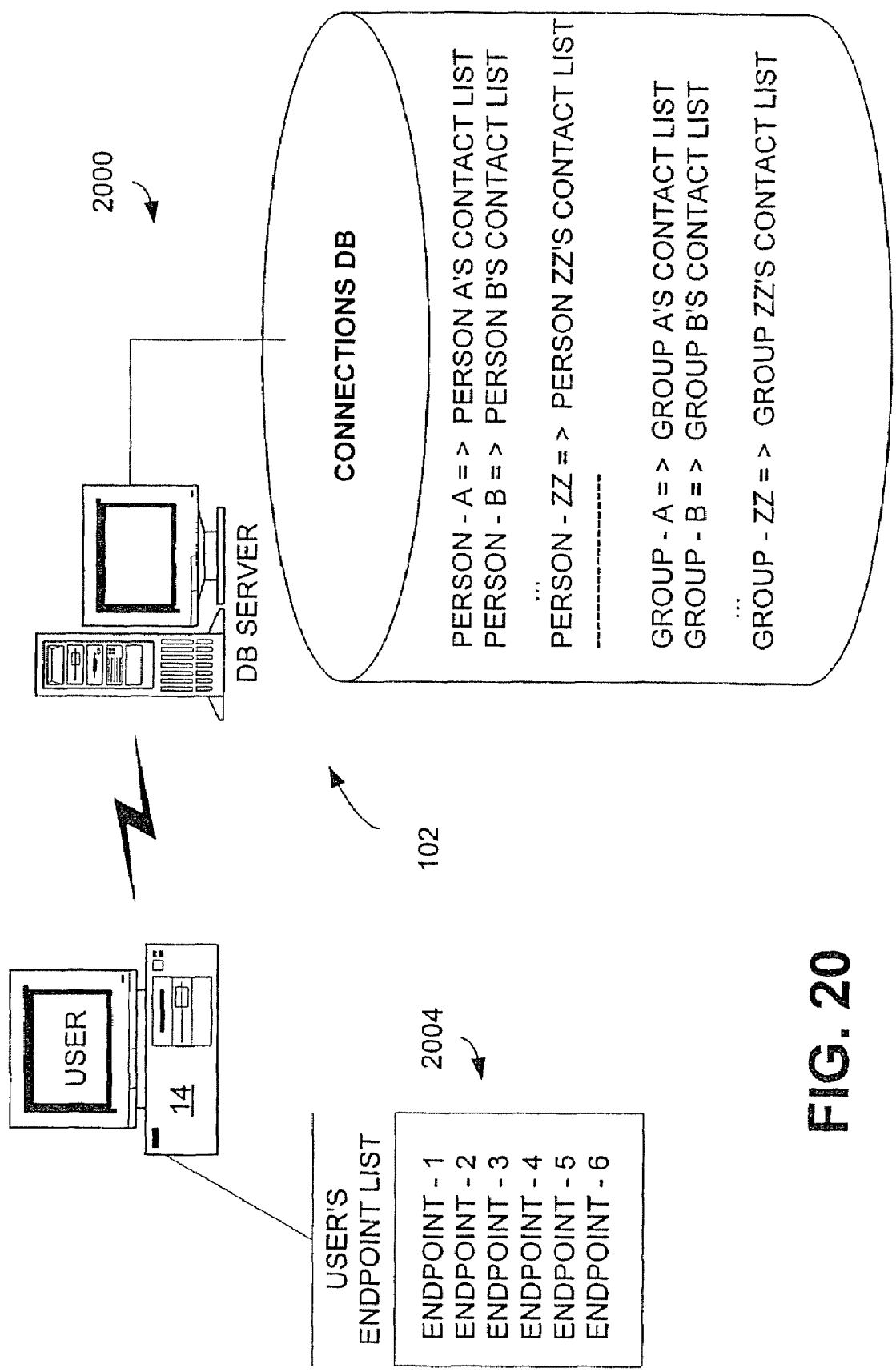
Figure 21:
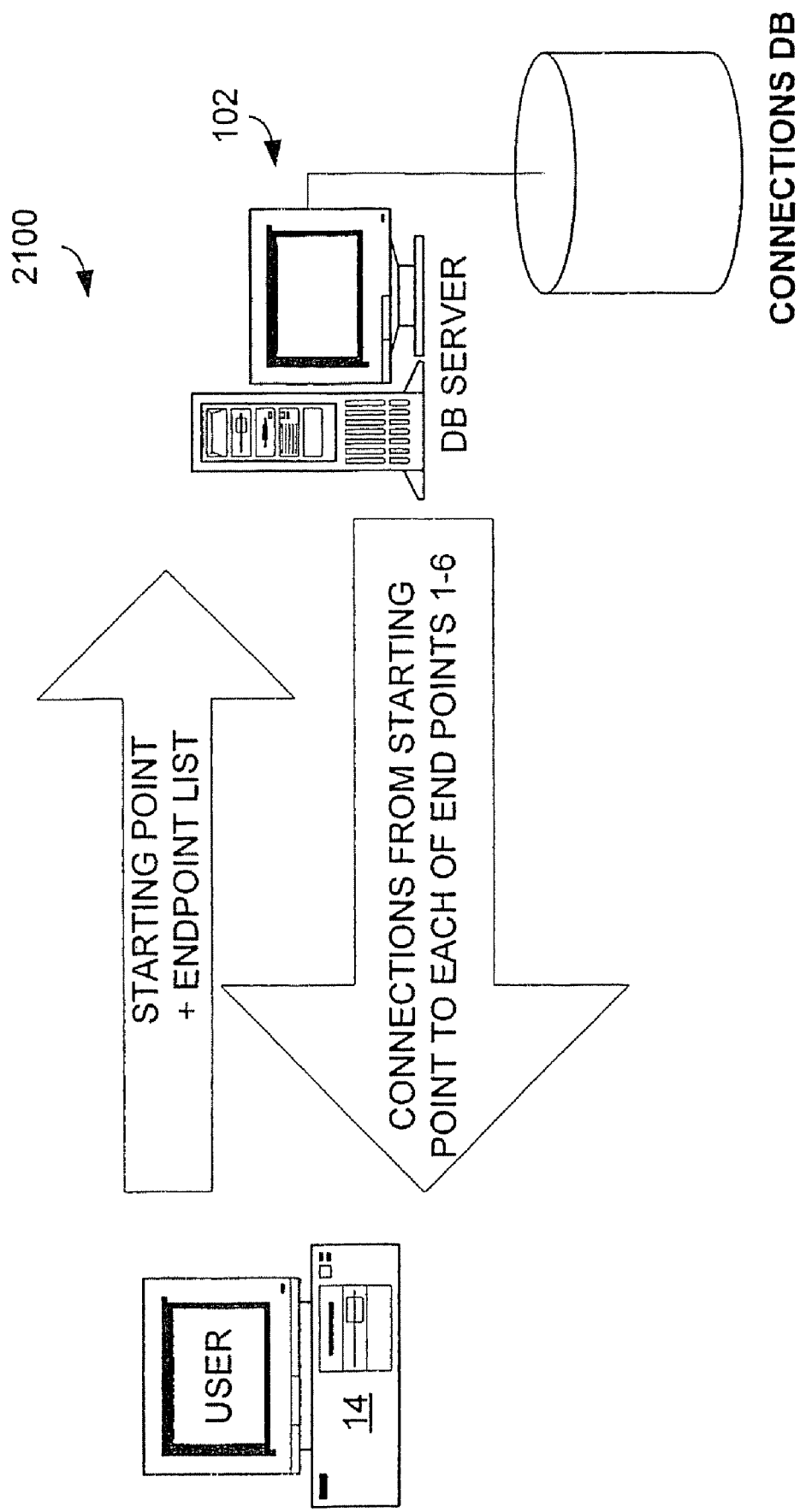

FIG. 20 is a diagram 2000 that shows only the use of an endpoint list 2004. A user's endpoint list 2004 can be resident on the connections system, user system, third party system, or some combination thereof. FIG. 21 is a diagram 2100 that shows the query and results process using the endpoint list 2004 of FIG. 20.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein. As used herein, the terms "includes" and "including" mean without limitation. It is intended by the following claims to claim any and all modifications and variations that fall within the true scope of the inventive concepts.

The invention claimed is:

1. A computer-implemented method of determining a pathway between a source and a target, comprising:
    providing at least one database including data defining individuals, entities, or both using at least one of a host computing system and a client computing system;
    defining a source list comprising one or more individuals, entities or both using at least one of the host computing system and the client computing system;
    defining a target list comprising one or more individuals, entities or both using at least one of the host computing system and the client computing system; and
    generating, using at least one of the host computing system and the client computing system, a set of intermediate connection points as a series of individuals, entities or both that collectively define the pathway from the source to the target, as a function of predetermined relationships among the individuals and entities comprising the pathway.

2. The computer-implemented method of claim 1 further comprising:
    providing at least one host database comprising identification data for each of a plurality of individuals and entities, wherein for each individual or entity said identification data includes relationships to at least one other individual or entity;
    defining a starting point as a list of at least one individual or entity;
    defining an endpoint as a list of at least one individual or entity; and
    generating at least one pathway that identifies a set of intermediate individuals, entities or both, wherein the identity of each intermediate individual or entity includes:
    a first set of identification data in common with a set of identification data of an individual or entity from the starting point or of a prior intermediate individual or entity; and
    a second set of identification data in common with a set of identification data of a subsequent intermediate individual or entity or of an individual or entity from the endpoint.

3. The method of claim 2 wherein at least one of the starting point and the endpoint is a list comprising a plurality of individuals, entities or both.

4. The method of claim 2 further comprising providing a user interface configured for entry of at least one of the starting point or endpoint.

5. The method of claim 2 wherein the identification data comprises an identification of the individual or entity.

6. The method of claim 2 wherein providing comprises deriving information from at least one private or public domain source including data representing individuals, entities or both.

7. The method of claim 6 wherein deriving information comprises parsing information from at least one private or public domain source.

8. The method of claim 6 wherein the at least one private or public domain source includes web sites, publications and databases.

9. The method of claim 2, further comprising, prior to generating, defining a maximum number of intermediate individuals, entities or both to comprise the at least one pathway.

10. The method of claim 2, further comprising:
for the at least one pathway, displaying the starting point, the one or more intermediate individuals, entities or both and the at least one endpoint.

11. A system for determining at least one pathway of one or more connections between at least one staffing point and at least one endpoint, wherein the system comprising:
at least one computer system including or having access to at least one database;
a host computing system module for providing including at least one host database comprising identification data for each of a plurality of individuals and entities, wherein for each individual or entity said identification data includes relationships to one or more other individual or entity;
first client computing system including a staffing point as a list of at least one individual or entity;
a second client computing system including an endpoint as a list of at least one individual or entity; and
at least one pathway that identifies a set of intermediate individuals, entities or both, the at least one pathway generated by at least one of the host computing system, the first client computing system, and the second client computing system,
wherein the identity of each intermediate individual or entity includes:
a first set of identification data in common with a set of identification data of an individual or entity from the staffing point or of a prior intermediate individual or entity; and
a second set of identification data in common with a set of identification data of a subsequent intermediate individual or entity or of an individual or entity from the endpoint.

12. The system of claim 11 wherein at least one of the starting point and the endpoint is a list comprising a plurality of individuals, entities or both.

13. The system of claim 11 further comprising a user interface configured for entry of at least one of the starting point or endpoint.

14. The system of claim 11 wherein the identification data comprises an identification of the individual or entity.

15. The system of claim 11 wherein providing at least one host database includes deriving information from at least one private or public domain source including data representing individuals, entities or both.

16. The system of claim 15 wherein deriving information comprises parsing information from at least one private or public domain source.

17. The system of claim 15 wherein the at least one private or public domain source includes web sites, publications and databases.

18. The system of claim 11, further comprising defining, via at least one of the computing systems, a maximum number of intermediate individuals, entities or both to comprise the at least one pathway.

19. The system of claim 11, further comprising:
displaying the at least one pathway via at least one of the computing systems, including displaying the starting point, the one or more intermediate individuals, entities or both and the at least one endpoint.

20. A computer-readable storage medium having stored thereon instructions for determining at least one pathway of one or more connections between at least one source and at least one target, said instructions when executed by a computer causes a processor to perform operations comprising:
defining a source list comprising one or more individuals, entities or both using at least one of a host computing system and a client computing system;
defining a target list comprising one or more individuals, entities or both using at least one of the host computing system and the client computing system; and
generating, via at least one of the host computing system and the client computing system, a set of intermediate connection points as a series of individuals, entities or both that collectively define the pathway from the source to the target, as a function of predetermined relationships among the individuals and entities comprising the pathway.

21. The computer-readable storage medium of claim 20 further comprising:
accessing at least one host database comprising identification data for each of a plurality of individuals and entities, wherein for each individual or entity said identification data includes relationships to at least one other individual or entity;
defining a starting point as a list of at least one individual or entity;
defining an endpoint as a list of at least one individual or entity; and
generating at least one pathway that identifies a set of intermediate individuals, entities or both, wherein the identity of each intermediate individual or entity includes:
a first set of identification data in common with a set of identification data of an individual or entity from the starting point or of a prior intermediate individual or entity; and
a second set of identification data in common with a set of identification data of a subsequent intermediate individual or entity or of an individual or entity from the endpoint.

* * * * *